US012149904B2

(12) United States Patent
Shin et al.

(10) Patent No.: US 12,149,904 B2
(45) **Date of Patent: *Nov. 19, 2024**

(54) METHODS, SYSTEMS, AND MEDIA FOR IDENTIFYING A PLURALITY OF SETS OF COORDINATES FOR A PLURALITY OF DEVICES

(71) Applicant: Google LLC, Mountain View, CA (US)

(72) Inventors: Dongeek Shin, Mountain View, CA (US); Gabriel Slotnick, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,370

(22) Filed: Jul. 31, 2023

(65) Prior Publication Data

US 2023/0379630 A1 Nov. 23, 2023

Related U.S. Application Data

(63) Continuation of application No. 17/565,916, filed on Dec. 30, 2021, now Pat. No. 11,716,569.

(51) Int. Cl.
*H04R 29/00* (2006.01)
*H04R 5/02* (2006.01)
(Continued)

(52) U.S. Cl.
CPC .................. *H04R 5/04* (2013.01); *H04R 5/02* (2013.01); *H04R 27/00* (2013.01); *H04R 29/001* (2013.01);
(Continued)

(58) Field of Classification Search
CPC .................. H04R 27/00; H04R 29/001; H04R 2227/005; H04R 2227/009; H04S 7/301;
(Continued)

(56) References Cited

U.S. PATENT DOCUMENTS 9,769,778 B2 * 9/2017 Daley .................... H04H 20/61
9,948,258 B2 * 4/2018 Marino, Jr. .......... H03G 3/3005
(Continued)

FOREIGN PATENT DOCUMENTS

WO WO 2021021682 2/2021

OTHER PUBLICATIONS

Nielsen, J.K., "Loudspeaker and Listening Position Estimation Using Smart Speakers", in Proceedings of International Conference on Acoustics, Speech and Signal Processing, Oct. 2018, pp. 1-6.
(Continued)

*Primary Examiner* — Disler Paul
(74) *Attorney, Agent, or Firm* — Brake Hughes Bellermann LLP

(57) ABSTRACT

Methods, systems, and media for identifying a plurality of sets of coordinates for a plurality of devices are provided. In some embodiments, the method comprises: identifying each device in a plurality of devices associated with a user account; instructing the plurality of devices to perform an audio sequence; receiving a plurality of transit times from the plurality of devices; determining a plurality of distances based on the plurality of transit times; determining a plurality of sets of coordinates based on the plurality of distances; associating to each of the plurality of devices a corresponding unique one of the plurality of sets of coordinates; and causing at least one of the plurality of devices to play spatial audio determined from the plurality of sets of coordinates.

21 Claims, 13 Drawing Sheets

(51) Int. Cl.

| | |
|---|---|
| ***H04R 5/04*** | (2006.01) |
| ***H04R 27/00*** | (2006.01) |
| ***H04S 7/00*** | (2006.01) |

(52) U.S. Cl.
CPC ........ *H04S 7/301* (2013.01); *H04R 2227/005* (2013.01); *H04R 2227/009* (2013.01)

(58) Field of Classification Search
CPC . H04S 227/005; H04S 2227/009; H04S 7/307
USPC ....................................... 381/56, 58–59, 103
See application file for complete search history.

(56) References Cited

U.S. PATENT DOCUMENTS

| | | | | |
|---|---|---|---|---|
| 10,296,287 | B2 * | 5/2019 | Yu | H04S 7/301 |
| 10,743,270 | B2 | 8/2020 | Daley et al. | |
| 10,805,750 | B2 | 10/2020 | Audfray | |
| 10,813,066 | B2 | 10/2020 | Daley et al. | |
| 11,194,542 | B2 * | 12/2021 | Yu | H04L 65/60 |
| 11,425,503 | B2 | 8/2022 | Arteaga et al. | |
| 2016/0142851 | A1 | 5/2016 | Sun et al. | |
| 2020/0329330 | A1 | 10/2020 | Mitchell et al. | |
| 2020/0366994 | A1 | 11/2020 | Arteaga et al. | |
| 2021/0118452 | A1 | 4/2021 | Tsingos et al. | |

OTHER PUBLICATIONS

Notice of Allowance dated Mar. 13, 2023 in U.S. Appl. No. 17/565,916.
Office Action dated Nov. 23, 2022 in U.S. Appl. No. 17/565,916.

* cited by examiner

METHODS, SYSTEMS, AND MEDIA FOR IDENTIFYING A PLURALITY OF SETS OF COORDINATES FOR A PLURALITY OF DEVICES

CROSS-REFERENCE TO RELATED APPLICATION

This application is a continuation of U.S. patent application Ser. No. 17/565,916, filed Dec. 30, 2021, which is hereby incorporated by reference herein in its entirety.

TECHNICAL FIELD

The disclosed subject matter relates to methods, systems, and media for identifying a plurality of sets of coordinates for a plurality of devices.

BACKGROUND

Users frequently install multiple speakers in specific locations within a room as a way to experience audio delivered across multiple channels (e.g., stereo). Common configurations include a 5.1 surround system, which requires the user to measure and place a series of speakers (e.g., right/left front speakers, right/left surround speakers, center channel speaker, and subwoofer) at specific places within a room. The user can then play multimedia which has been created with corresponding sound channels to provide a spatial audio experience. However, such configurations often require significant investments in both time and money to acquire the speakers and to manually place the speakers at the correct location.

Meanwhile, networked speakers such as smart home and voice assistant devices (e.g., GOOGLE HOME products, APPLE HOME products, and AMAZON ECHO products) are increasingly popular in homes, and users frequently have multiple such speakers throughout their homes. However, in order to properly use networked speakers in a multi-speaker configuration, it is important to know the location of the networked speakers.

Accordingly, it is desirable to provide new methods, systems, and media for identifying a plurality of sets of coordinates for a plurality of devices.

SUMMARY

In accordance with some implementations of the disclosed subject matter, methods, systems, and media for identifying a plurality of sets of coordinates for a plurality of devices are provided.

In accordance with some implementations of the disclosed subject matter, methods for identifying a plurality of sets of coordinates for a plurality of devices are provided, the methods comprising: identifying each device in a plurality of devices associated with a user account; instructing the plurality of devices to perform an audio sequence; receiving a plurality of transit times from the plurality of devices; determining a plurality of distances based on the plurality of transit times; determining a plurality of sets of coordinates based on the plurality of distances; associating to each of the plurality of devices a corresponding unique one of the plurality of sets of coordinates; and causing at least one of the plurality of devices to play spatial audio determined from the plurality of sets of coordinates.

In some of these methods, the plurality of devices includes a first leader device and a responder group of at least one responder device and the instructing the plurality of devices to perform the audio sequence comprises instructing the first leader device to: select a first ping audio tone from a library of audio tones; instruct each of the at least one responder device in the responder group to receive the first ping audio tone and to determine a first ping arrival time; provide response instructions to each of the at least one responder device in the responder group; play the first ping audio tone; determine a first start time; receive the response audio tone from each of the at least one responder device in the responder group; determine a first response arrival time corresponding to the response audio tone received from each of the at least one responder device in the responder group; receive the first ping arrival time for each of the at least one responder device in the responder group; determine a transit time for each of the at least one responder device in the responder group; and send the transit time for each of the at least one responder device in the responder group to a server.

In some of these methods, the instructing the plurality of devices to perform the audio sequence further comprises instructing the first leader device to: remove a transition device in the responder group from the responder group; set the transition device as a second leader device; and wherein the second leader device: selects a second ping audio tone from the library of audio tones; instructs each of the at least one responder device in the responder group to receive the second ping audio tone and to determine a second ping arrival time; provide response instructions to each of the at least one responder device in the responder group; play the second ping audio tone; determine a second start time; receive the response audio tone from each of the at least one responder device in the responder group; determine a second response arrival time corresponding to the response audio tone received from each of the at least one responder device in the responder group; receive the second ping arrival time for each of the at least one responder device in the responder group; determine a transit time for each of the at least one responder device in the responder group; and send the transit time for each of the at least one responder device in the responder group to a server.

In some of these methods, the instructing the plurality of devices to perform the audio sequence comprises one or more of the plurality of devices emitting one or more of a plurality of audio tones.

In some of these methods, the instructing the plurality of devices to perform the audio sequence comprises generating an audio tone comprising frequencies outside a range of human hearing.

In some of these methods, playing spatial audio comprises using the plurality of sets of coordinates to determine an audio characteristic for at least one device in the plurality of devices.

In some of these methods, playing spatial audio comprises using the plurality of sets of coordinates and using a location corresponding to a user device to modify at least one characteristic of audio played by at least one device in the plurality of devices.

In accordance with some implementations of the disclosed subject matter, systems for identifying a plurality of sets of coordinates for a plurality of devices are provided, the systems comprising: a memory; and a hardware processor that is coupled to the memory and that is configured to: identify each of the plurality of devices associated with a user account; instruct the plurality of devices to perform an audio sequence; receive a plurality of transit times from the plurality of devices; determine a plurality of distances based on the plurality of transit times; determine a plurality of sets of coordinates based on the plurality of distances; associate to each of the plurality of devices a corresponding unique one of the plurality of sets of coordinates; and cause at least one of the plurality of devices to play spatial audio determined from the plurality of sets of coordinates.

In some of these systems, the plurality of devices includes a first leader device and a responder group of at least one responder device and the instructing the plurality of devices to perform the audio sequence comprises instructing the first leader device to: select a first ping audio tone from a library of audio tones; instruct each of the at least one responder device in the responder group to receive the first ping audio tone and to determine a first ping arrival time; provide response instructions to each of the at least one responder device in the responder group; play the first ping audio tone; determine a first start time; receive the response audio tone from each of the at least one responder device in the responder group; determine a first response arrival time corresponding to the response audio tone received from each of the at least one responder device in the responder group; receive the first ping arrival time for each of the at least one responder device in the responder group; determine a transit time for each of the at least one responder device in the responder group; and send the transit time for each of the at least one responder device in the responder group to a server.

In some of these systems, the instructing the plurality of devices to perform the audio sequence further comprises instructing the first leader device to: remove a transition device in the responder group from the responder group; set the transition device as a second leader device; and wherein the second leader device: selects a second ping audio tone from the library of audio tones; instructs each of the at least one responder device in the responder group to receive the second ping audio tone and to determine a second ping arrival time; provide response instructions to each of the at least one responder device in the responder group; play the second ping audio tone; determine a second start time; receive the response audio tone from each of the at least one responder device in the responder group; determine a second response arrival time corresponding to the response audio tone received from each of the at least one responder device in the responder group; receive the second ping arrival time for each of the at least one responder device in the responder group; determine a transit time for each of the at least one responder device in the responder group; and send the transit time for each of the at least one responder device in the responder group to a server.

In some of these systems, the instructing the plurality of devices to perform the audio sequence comprises one or more of the plurality of devices emitting one or more of a plurality of audio tones.

In some of these systems, the instructing the plurality of devices to perform the audio sequence comprises generating an audio tone comprising frequencies outside a range of human hearing.

In some of these systems, playing spatial audio comprises using the plurality of sets of coordinates to determine an audio characteristic for at least one device in the plurality of devices.

In some of these systems, playing spatial audio comprises using the plurality of sets of coordinates and using a location corresponding to a user device to modify at least one characteristic of audio played by at least one device in the plurality of devices.

In accordance with some implementations of the disclosed subject matter, non-transitory computer-readable media containing computer executable instructions that, when executed by a processor, cause the processor to execute a method for identifying a plurality of sets of coordinates for a plurality of devices is provided, the method comprising: identifying each device in a plurality of devices associated with a user account; instructing the plurality of devices to perform an audio sequence; receiving a plurality of transit times from the plurality of devices; determining a plurality of distances based on the plurality of transit times; determining a plurality of sets of coordinates based on the plurality of distances; associating to each of the plurality of devices a corresponding unique one of the plurality of sets of coordinates; and causing at least one of the plurality of devices to play spatial audio determined from the plurality of sets of coordinates.

In some of these non-transitory computer-readable media, the plurality of devices includes a first leader device and a responder group of at least one responder device and the instructing the plurality of devices to perform the audio sequence comprises instructing the first leader device to: select a first ping audio tone from a library of audio tones; instruct each of the at least one responder device in the responder group to receive the first ping audio tone and to determine a first ping arrival time; provide response instructions to each of the at least one responder device in the responder group; play the first ping audio tone; determine a first start time; receive the response audio tone from each of the at least one responder device in the responder group; determine a first response arrival time corresponding to the response audio tone received from each of the at least one responder device in the responder group; receive the first ping arrival time for each of the at least one responder device in the responder group; determine a transit time for each of the at least one responder device in the responder group; and send the transit time for each of the at least one responder device in the responder group to a server.

In some of these non-transitory computer-readable media, the instructing the plurality of devices to perform the audio sequence further comprises instructing the first leader device to: remove a transition device in the responder group from the responder group; set the transition device as a second leader device; and wherein the second leader device: selects a second ping audio tone from the library of audio tones; instructs each of the at least one responder device in the responder group to receive the second ping audio tone and to determine a second ping arrival time; provide response instructions to each of the at least one responder device in the responder group; play the second ping audio tone; determine a second start time; receive the response audio tone from each of the at least one responder device in the responder group; determine a second response arrival time corresponding to the response audio tone received from each of the at least one responder device in the responder group; receive the second ping arrival time for each of the at least one responder device in the responder group; determine a transit time for each of the at least one responder device in the responder group; and send the transit time for each of the at least one responder device in the responder group to a server.

In some of these non-transitory computer-readable media, the instructing the plurality of devices to perform the audio sequence comprises one or more of the plurality of devices emitting one or more of a plurality of audio tones.

In some of these non-transitory computer-readable media, the instructing the plurality of devices to perform the audio sequence comprises generating an audio tone comprising frequencies outside a range of human hearing.

In some of these non-transitory computer-readable media, playing spatial audio comprises using the plurality of sets of coordinates to determine an audio characteristic for at least one device in the plurality of devices.

In some of these non-transitory computer-readable media, playing spatial audio comprises using the plurality of sets of coordinates and using a location corresponding to a user device to modify at least one characteristic of audio played by at least one device in the plurality of devices.

DETAILED DESCRIPTION

In accordance with some implementations, mechanisms (which can include methods, systems, and media) for identifying a plurality of sets of coordinates for a plurality of devices are provided.

In accordance with some implementations of the disclosed subject matter, the mechanisms described herein can identify, for each of a plurality of devices, a set of coordinates using a sound ranging procedure. In some implementations, identifying coordinates of a series of smart home devices using methods provided by the disclosed subject matter can allow users to use spatial audio (e.g., surround sound) in an audio/visual experience.

In some implementations, a user can select which devices to include in the sound ranging procedure through a user device and send a request to a server. In some implementations, the server can direct the plurality of devices to perform an audio sequence that results in a series of transit times.

In some implementations, the audio sequence can be a series of pings and responses, with each device in the plurality of devices taking a turn as the leader sending out the first ping (e.g., round-robin style). In some implementations, the audio sequence can use audio tones above the range of human hearing (e.g., ultrasound) to complete the series of pings and responses. In some implementations, audio pings and responses can be used to determine the round trip transit time between each pair of devices in the plurality of devices. In some implementations, this set of transit times can be stored as a matrix and can be sent to the server.

In some implementations, the server can determine a distance matrix corresponding to the matrix of transit times by using a given speed of sound (which can be constant or variable based on environmental conditions). In some implementations, the distance matrix can have the properties of a Euclidian distance matrix. In some implementations, multi-dimensional scaling can be used to identify a set of (x,y) and/or (x,y,z) coordinates corresponding to the distances in the Euclidian distance matrix. In some implementations, the server can assign the corresponding set of coordinates to each of the devices in the plurality of devices. In some implementations, the server can also store the plurality of sets of coordinates in association with the user account for the user who requested the sound ranging procedure. In some implementations, the server can use the plurality of sets of coordinates to determine audio delay(s) and/or audio channels to send to each of the devices in the plurality of devices. In some implementations, the server can implement surround sound, and/or any other suitable spatial audio standard, using the plurality of sets of coordinates.

Figure 1:
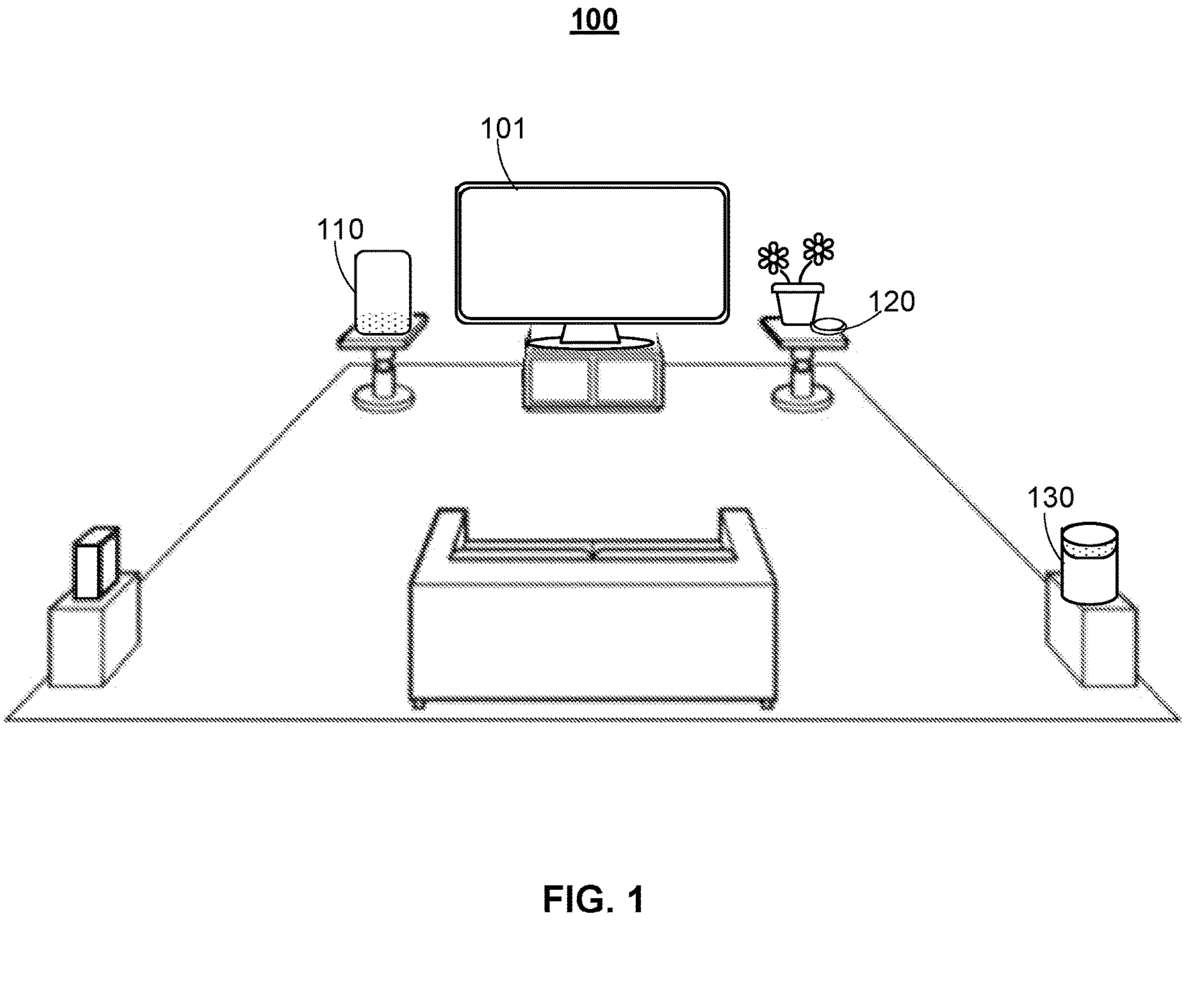
FIG. 1 shows an example illustration of a room with audio-visual equipment in accordance with some implementations of the disclosed subject matter.

Turning to FIG. 1, an example illustration of a room 100 with audio-visual equipment in accordance with some implementations of the disclosed subject matter is shown. In some implementations, room 100 can include equipment such as a television 101, a smart speaker 110, a smart speaker 120, and a smart speaker 130. In some implementations, television 101 can send audio to smart speakers 110, 120, and 130. In accordance with some implementations of the disclosed subject matter, television 101 can send spatial audio to speakers 110, 120, and 130. In some implementations, smart speakers 110, 120, and 130 can be placed at any suitable positions within room 100. For example, in some implementations, smart speaker 110 can be positioned in one corner of the room on a side table. Continuing this example, smart speaker 120 can be positioned in an opposite corner on a table of a different height, in some implementations. In some implementations, smart speakers 110, 120, and 130 can be placed according to a user's preference for using features such as a voice assistant within the smart speaker.

In some implementations, room 100 can include any other suitable style of networked speakers. For example, in some implementations, a smart speaker can be implemented using a smart display and/or a tablet having one or more speakers (not shown).

Figure 2:
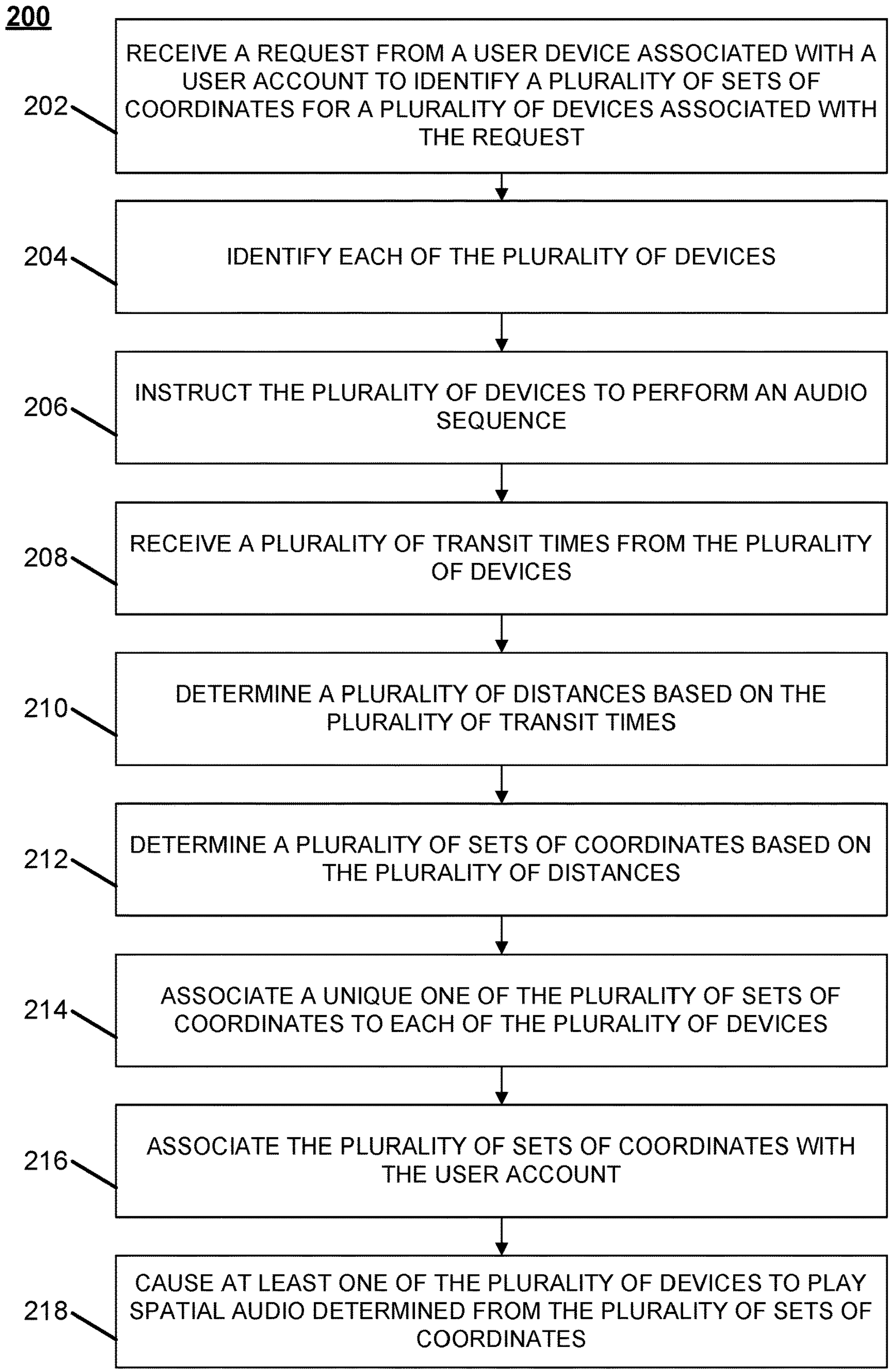
FIG. 2 shows an example flow diagram of a process for identifying a plurality of sets of coordinates for a plurality of devices in accordance with some implementations of the disclosed subject matter.

Turning to FIG. 2, an example flow diagram of a process 200 for identifying a plurality of sets of coordinates for a plurality of devices in accordance with some implementations of the disclosed subject matter is shown. In some implementations, process 200 can run on a server such as server 902 described below in connection with FIG. 9.

At 202, process 200 can receive a request from a user device associated with a user account to identify a plurality of sets of coordinates for a plurality of devices associated with the request in some implementations. In some implementations, process 200 can receive the request in any suitable manner. In some implementations, the plurality of devices can be devices previously linked to the user account. In some implementations, the plurality of devices can include user devices such as devices 906 described below in connection with FIG. 9. In some implementations, the plurality of devices can include voice activated speakers, smart speakers, voice activated assistants, smart thermostats, and/or any other suitable devices having speakers for playing audio. In some implementations, the plurality of devices can include any number of devices.

At 204, process 200 can identify each of the plurality of devices in some implementations. In some implementations, process 200 can send any suitable message to each of the plurality of devices at 204. For example, process 200 can send a message to query the status of each of the plurality of devices in some implementations. In some implementations, process 200 can, at 204, check for an active wired and/or wireless connection with each of the plurality of devices. In some implementations, process 200 can query the plurality of devices for any suitable information. For example, in some implementations, process 200 can, at 204, query each of the plurality of devices on a status of audio input (e.g., microphone), audio output (e.g., speaker), and/or any other suitable components (e.g., hardware, firmware version, operating system, etc.) of each of the plurality of devices. In some implementations, at 204, process 200 can remove any suitable number of devices from the plurality of devices included in the request at 202. For example, in some implementations, process 200 can determine that a device included in the request at 202 is not online, does not have a suitable firmware version, and/or meets any other suitable rejection criteria.

At 206, process 200 can instruct the plurality of devices to perform an audio sequence such as that described below in connection with process 300 of FIG. 3, in some implementations. In some implementations, process 200 can use any suitable audio sequence.

At 208, process 200 can receive a plurality of transit times from the plurality of devices in some implementations. These transit times can be received at any suitable point(s) in time, such as at a conclusion of the audio sequence, in some implementations. In some implementations, one or more transit times can be received from each device in the plurality of devices. For example, as described in connection with FIG. 3 below, the audio sequence can be performed multiple times and a given device can transmit a plurality of transit times with each repetition of the audio sequence from 206 in some implementations. In some implementations, the plurality of transit times can be substituted with a plurality of time stamps, elapsed times, time delays, and/or any other suitable timing information.

In some implementations, any suitable number of transit times can be received at 208. In some implementations, the number of transit times in the plurality of transit times can correspond to the number of devices in the plurality of devices. For example, each transit time can represent the time for an audio tone to travel between a pair of devices in the plurality of devices in some implementations. Continuing this example, the number of transit times can equal the number of possible two device combinations from the plurality of devices in some implementations. In some implementations, the plurality of transit times can be stored in matrix form, as described in connection with FIG. 7 below.

At 210, process 200 can determine a plurality of distances based on the plurality of transit times received at 208 in some implementations. In some implementations, process 200 can use a constant speed of sound to calculate a distance associated with each transit time in the plurality of transit times. In some implementations, process 200 can use a variable speed of sound where process 200 takes additional inputs such as altitude, air pressure, temperature, etc., to determine a speed of sound. In some implementations, the plurality of distances determined at 210 can be determined by any suitable ranging calculation. In some implementations, at 210, process 200 can multiply, divide, and/or perform any other suitable scalar and/or matrix operation on the first matrix from 208 to determine a second matrix at 210.

At 212, process 200 can determine a plurality of sets of coordinates based on the plurality of distances in some implementations. In some implementations, the plurality of distances can have the properties of a Euclidian Distance Matrix. In some implementations, process 200 can use multidimensional scaling (i.e., classical multidimensional scaling, principal coordinates analysis, etc.) to output the plurality of sets of coordinates as a coordinate matrix when given the plurality of distances from 210 arranged in a matrix as an input. In some implementations, process 200 can run any suitable mathematical calculation, combination of mathematical calculation(s), and/or algorithm(s) to arrive at the plurality of sets of coordinates.

In some implementations, each of a set of coordinates within the plurality of sets of coordinates can be a pair of real-valued decimal numbers within a two-dimensional coordinate system. In some implementations, each of the set of coordinates can be referenced to a two-dimensional Cartesian coordinate system, a polar coordinate system, and/or any other suitable coordinate system. In some implementations, each of the set of coordinates can be three real-valued decimal numbers within a three-dimensional coordinate system. In some implementations, each of the set of coordinates can be referenced to a three-dimensional Cartesian coordinate system, a spherical coordinate system, a cylindrical coordinate system, and/or any other suitable coordinate system.

In some implementations, the quantity of devices within the plurality of devices can be related to the coordinate system used. For example, in some implementations, for three devices in the plurality of devices, a two-dimensional coordinate system can be used. In another example, in some implementations, for four devices in the plurality of devices, a three-dimensional coordinate system can be used at 212.

In some implementations, an origin point of the coordinate system can be any suitable reference point. For example, in some implementations, the origin point can correspond to one of the set of coordinates, further corresponding to one of the plurality of devices as described at 214. In some implementations, the origin point can correspond to the user device which initiated the request.

In some implementations, one or more devices in the plurality of devices and/or the user device can have a GPS coordinate, a local zip code, an IP address, and/or any other suitable location information. In some implementations, location information from one or more devices in the plurality of devices and/or the user device can be combined with the plurality of sets of coordinates. For example, in some implementations, a two-dimensional coordinate system can be referenced to the GPS coordinate of one of the devices in the plurality of devices and/or the user device.

At 214, process 200 can associate a unique one of the plurality of sets of coordinates to each of the plurality of devices in some implementations. The plurality of sets of coordinates can be associated with the plurality of devices in any suitable manner in some implementations.

At 216, process 200 can associate the plurality of sets of coordinates with the user account in some implementations. The plurality of sets of coordinates can be associated with the user account in any suitable manner in some implementations.

At 218, process 200 can cause at least one of the plurality of devices to play spatial audio determined from the plurality of sets of coordinates in some implementations. In some implementations, spatial audio can refer to surround sound, audio playback at different rates for different devices, delays across speakers, and/or any other suitable audio technique. In some implementations, process 200 can use the plurality of sets of coordinates to determine a unique audio playback rate, a delay, a volume enhancement, and/or any other suitable audio effect to apply to at least one of the plurality of devices. In some implementations, any other suitable information, such as location information, local time, etc., can be combined with the plurality of sets of coordinates to play spatial audio. For example, in some implementations, a user device associated with the user account which requested the plurality of sets of coordinates can have a GPS location that shows proximity to a set of coordinates from the plurality of sets of coordinates, and process 200 can cause the device corresponding to the set of coordinates to change the characteristics of audio played from the device (e.g., volume, delay, phase, etc.)

In some implementations, process 200 can end when the plurality of sets of coordinates have been used at 218 to determine a spatial audio and/or any other suitable audio effect.

Figure 3:
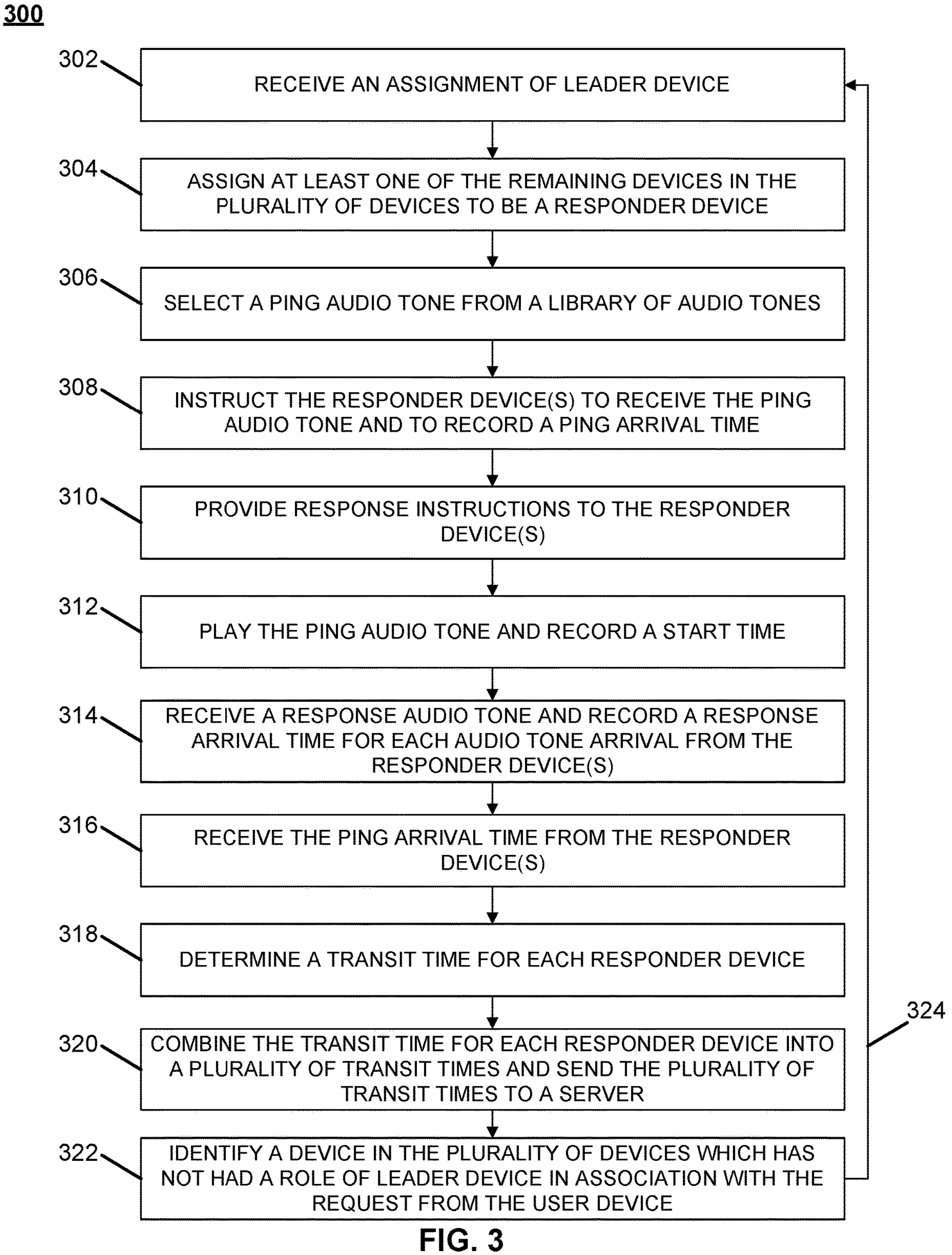
FIG. 3 shows an example flow diagram of a process for a plurality of devices to execute an audio sequence in accordance with some implementations of the disclosed subject matter.

Turning to FIG. 3, an example flow diagram of a process 300 for a plurality of devices to perform an audio sequence in accordance with some implementations of the disclosed subject matter is shown. In some implementations, process 300 can be performed by one of a plurality of devices as described in connection with process 200 in FIG. 2 above. In some implementations, process 300 can begin at the instruction of a server, such as server 902. In some implementations, a user device, such as device 906 as described in connection with FIG. 9 below, can implement process 300.

At 302, in some implementations, a device from the plurality of devices at 206 of process 200 can receive an assignment of leader device in any suitable manner.

At 304, the leader device can assign at least one of the remaining devices in the plurality of devices to be a responder device in any suitable manner. In some implementations, the responder devices can be a responder group.

At 306, the leader device can select any suitable audio tone from a library of audio tones in some implementations. In some implementations, the leader device can select an audio tone which includes frequencies outside of the range of human hearing (e.g., ultrasound, audible waveforms that are masked as pings like a device setup sound, etc.). In some implementations, the leader device can select the audio tone in any suitable manner. In some implementations, the leader device can select multiple audio tones at 306. For example, the leader device can select a first audio tone which can be referred to as a "ping audio tone" and a second audio tone which can be referred to as a "response audio tone" in some implementations. In some implementations, the leader device can select any suitable number of audio tones.

At 308, the leader device can instruct the responder device(s) to receive an audio tone selected at 306 (e.g., ping audio tone) and to record a ping arrival time $T_{leader,responder}$ in some implementations. In some implementations, the responder device(s) can record the ping arrival time in any suitable manner.

At 310, the leader device can provide response instructions to the responder device(s) in some implementations. In some implementations, the response instructions can include an amount of time for the responder device(s) to wait ('wait time') before the responder device initiates an audio response. In some implementations, the response instructions can also include an audio tone for the responder device(s) to use in the audio response. In some implementations, the response instructions can include any other suitable information.

In some implementations, the wait time can be unique for each responder device $T_{wait,responder}$. In some implementations, the leader device and/or the responder device(s) can determine the wait time in any suitable manner. In some implementations, properties of the responder device(s) can be used to determine the wait time(s). For example, in some implementations, the wait time can be determined by a processor clock speed, a memory read time, a memory write time, and/or any other suitable properties of the responder device(s). In some implementations, the wait time can be referenced in the response instructions as equal to an amount of elapsed time after the audio tone arrival. In some implementations, the wait time can be referenced in the response instructions as an absolute time (e.g., timestamp in any suitable format) at which the responder device can initiate the audio tone response. In some implementations, the wait time can be referenced in the response instructions in any suitable manner. In some implementations, the wait time can be randomly or pseudo randomly selected from a range of wait times.

In some implementations, the audio tone referenced in the response instructions can be a second audio tone selected at 306 (e.g., response audio tone). In some implementations, the audio tone in the response instructions can be related to the ping audio tone in any suitable manner. For example, as discussed in connection with audio response 422 in FIG. 4 below, the audio tone can be identical and/or mathematically related to the first audio tone selected at 306 (e.g., ping audio tone). In some implementations, the audio tone in the response instructions can be any suitable audio tone.

At 312, the leader device can play the ping audio tone and record a start time $T_{start}$ in some implementations. In some implementations, start time $T_{start}$ can be recorded in any suitable time format. For example, start time $T_{start}$ can be recorded as a UTC timestamp, a timestamp for the local time zone, an epoch timestamp, and/or any other suitable time format.

At 314, the leader device can receive the response audio tone and can record a response arrival time $T_{responder,leader}$ for each audio tone arrival from the responder device(s) in some implementations. For example, in some implementations, process 300 can have three responder devices, and process 300 can record three arrival times at the leader device, corresponding to each responder device sending the audio tone from the instruction at 310. In some implementations, arrival time(s) can be recorded as a UTC timestamp, a timestamp in the local time zone, an epoch timestamp, and/or any other suitable time format.

At 316, the leader device can receive, from each responder device, arrival time $T_{leader,responder}$ and wait time $T_{responder,wait}$ in some implementations. In some implementations, the leader device can receive communication at 316 over a wired and/or wireless network from each responder device. In some implementations, arrival time(s) $T_{leader,responder}$ and wait time(s) $T_{responder,wait}$ can be recorded as a UTC timestamp, a timestamp in the local time zone, an epoch timestamp, and/or any other suitable time format.

At 318, the leader device can determine a transit time for each responder device in some implementations. In some implementations, the leader device can combine the start time $T_{start}$ from 312, arrival time $T_{responder,leader}$ from 314, arrival time $T_{leader,responder}$ and wait time $T_{responder,wait}$ from 316 to determine a transit time $T[\text{transit}]_{leader,responder}$. In some implementations, process 300 can determine a transit time for each leader-responder device pair. In some implementations, detailed examples of process 300 can be found below in connection with FIGS. 4B, 5B, and 6B.

In some implementations, for a given leader-responder device pair, process 300 can determine the transit time using Equation 1 below:

$$T[\text{transit}]_{leader,responder}=(1/2)*(T_{responder,leader}-T_{start}-T_{responder,wait}) \quad (1)$$

In some implementations, for a given leader-responder device pair, process 300 can determine the transit time using Equation 2 below:

$$T[\text{transit}]_{leader,responder}=T_{leader,responder}-T_{start} \quad (2)$$

In some implementations, process 300 can determine the transit time for a given leader-responder device pair using any other suitable calculation. For example, in some implementations, process 300 can determine the transit time using an average of the determined transit times from Equations 1 and 2.

At 320, process 300 can combine the transit times computed at 318 into a plurality of transit times in some implementations. In some implementations, process 300 can include identification of which transit time corresponds to which leader-responder device pair. In some implementations, process 300 can send the plurality of transit times to a server, as described at 208 of process 200 in connection with FIG. 2 above. In some implementations, process 300 can send the message using any suitable technique.

At 322, process 300 can identify a device from the plurality of devices which has not had a role of leader device in some implementations. For example, in some implementations, process 300 can choose a responder device in the responder group to be a transition device and can assign the transition device to the role of leader device. In some implementations, process 300 can end at 322. In some implementations, process 300 can proceed to 302 with a new device serving the role of leader device in some implementations.

At 324, process 300 can loop to 302 in some implementations. In some implementations, process 300 can loop any suitable number of times. In some implementations, process 300 can loop to 302 with any suitable frequency.

It should be understood that at least some of the above-described blocks of the processes of FIGS. 2 and 3 can be executed or performed in any order or sequence not limited to the order and sequence shown in and described in connection with the figures. Also, some of the above blocks of the processes of FIGS. 2 and 3 can be executed or performed substantially simultaneously where appropriate or in parallel to reduce latency and processing times. Additionally or alternatively, some of the above described blocks of the processes of FIGS. 2 and 3 can be omitted.

Figure 4A:
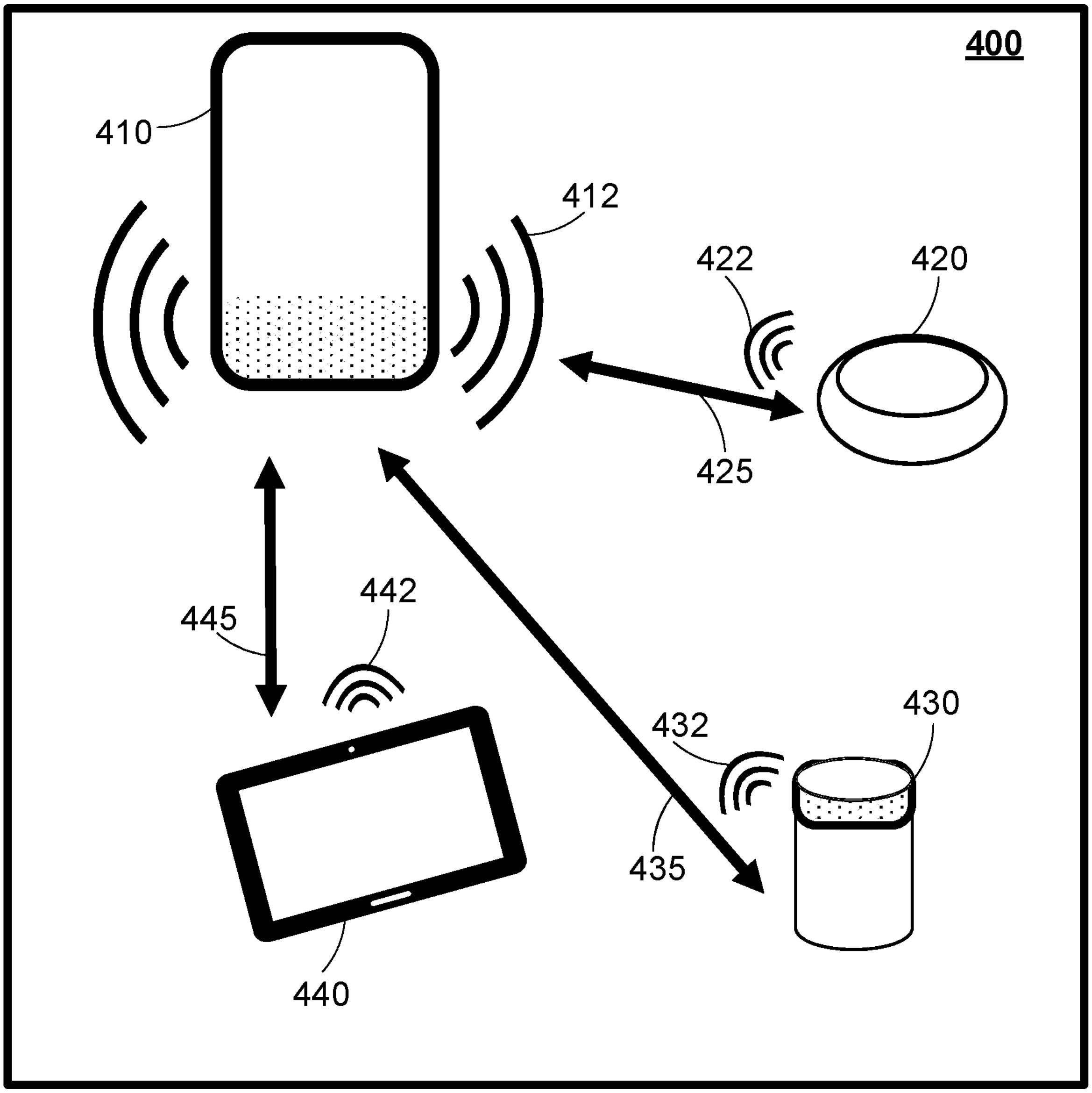
FIG. 4A shows an example illustration of a plurality of devices using an audio sequence to determine transit times in accordance with some implementations of the disclosed subject matter.

Turning to FIG. 4A, an example block diagram of an audio sequence 400 used by a plurality of devices for generating transit times in accordance with some implementations of the disclosed subject matter is shown. In some implementations, audio sequence 400 includes a leader device 410, a responder device 420, a responder device 430, and a responder device 440. In some implementations, leader device 410 and responder devices 420, 430, and 440 can form a plurality of devices used in process 200 as described above in connection with FIG. 2. In some implementations, leader device 410 and responder devices 420, 430, and 440 can each be a user device such as user devices 906 described in connection with FIG. 9 below. While three responder devices are illustrated in FIG. 4, any suitable number of responder devices can be used in some implementations.

In some implementations, leader device 410 can be assigned the role of leader at 302 of process 300 as described in connection with FIG. 3 above. In some implementations, responder devices 420, 430, and 440 can be assigned the role of responder at 304 of process 300 as described in connection with FIG. 3 above. In some implementations, responder devices 420, 430, and 440 can be a responder group. In some implementations, leader device 410 and responder devices 420, 430, and 440 can be positioned in any suitable arrangement. In some implementations, leader device 410 and responder devices 420, 430, and 440 can be placed in a room together in any suitable location.

In some implementations, leader device 410 can broadcast an audio ping 412. In some implementations, audio ping 412 can be any suitable audio tone and/or waveform and can contain any suitable audio frequencies. For example, audio ping 412 can be a short (e.g., 10 ms) burst of ultrasonic frequencies in some implementations.

In some implementations, responder device 420 can broadcast an audio response 422. In some implementations, audio response 422 can be any suitable audio tone and/or waveform and can contain any suitable audio frequencies. For example, when audio ping 412 is a burst of ultrasonic frequencies, audio response 422 can be identical to audio ping 412, and/or mathematically related to audio ping 412 in any suitable manner (e.g., phase shifted, frequency shifted, etc.), in some implementations. In some implementations, audio response 422 can be spectrally distinct from audio ping 412. In some implementations, responder device 420 can send additional communication signals (e.g., wireless messages) to leader device 410 over communication link 425.

In some implementations, responder device 430 can broadcast an audio response 432. In some implementations, audio response 432 can be any suitable audio tone and/or waveform and can contain any suitable audio frequencies. For example, audio response 432 can be a burst of ultrasonic frequencies in some implementations. In some implementations, audio response 432 can be identical to audio ping 412, and/or mathematically related to audio ping 412 in any suitable manner (e.g., phase shifted, frequency shifted, etc.). In some implementations, audio response 432 can be spectrally distinct from audio ping 412 and/or from audio response 422. In some implementations, responder device 430 can send additional communication signals (e.g., wireless messages) to leader device 410 over communication link 435.

In some implementations, responder device 440 can broadcast an audio response 442. In some implementations, audio response 442 can be any suitable audio tone and/or waveform and can contain any suitable audio frequencies. For example, audio response 442 can be a burst of ultrasonic frequencies in some implementations. In some implementations, audio response 442 can be identical to audio ping 412, and/or mathematically related to audio ping 412 in any suitable manner (e.g., phase shifted, frequency shifted, etc.). In some implementations, audio ping 442 can be spectrally distinct from audio ping 412 and/or audio responses 422 and/or 432. In some implementations, responder device 440 can send additional communication signals (e.g., wireless messages) to leader device 410 over communication link 445.

Figure 4B:
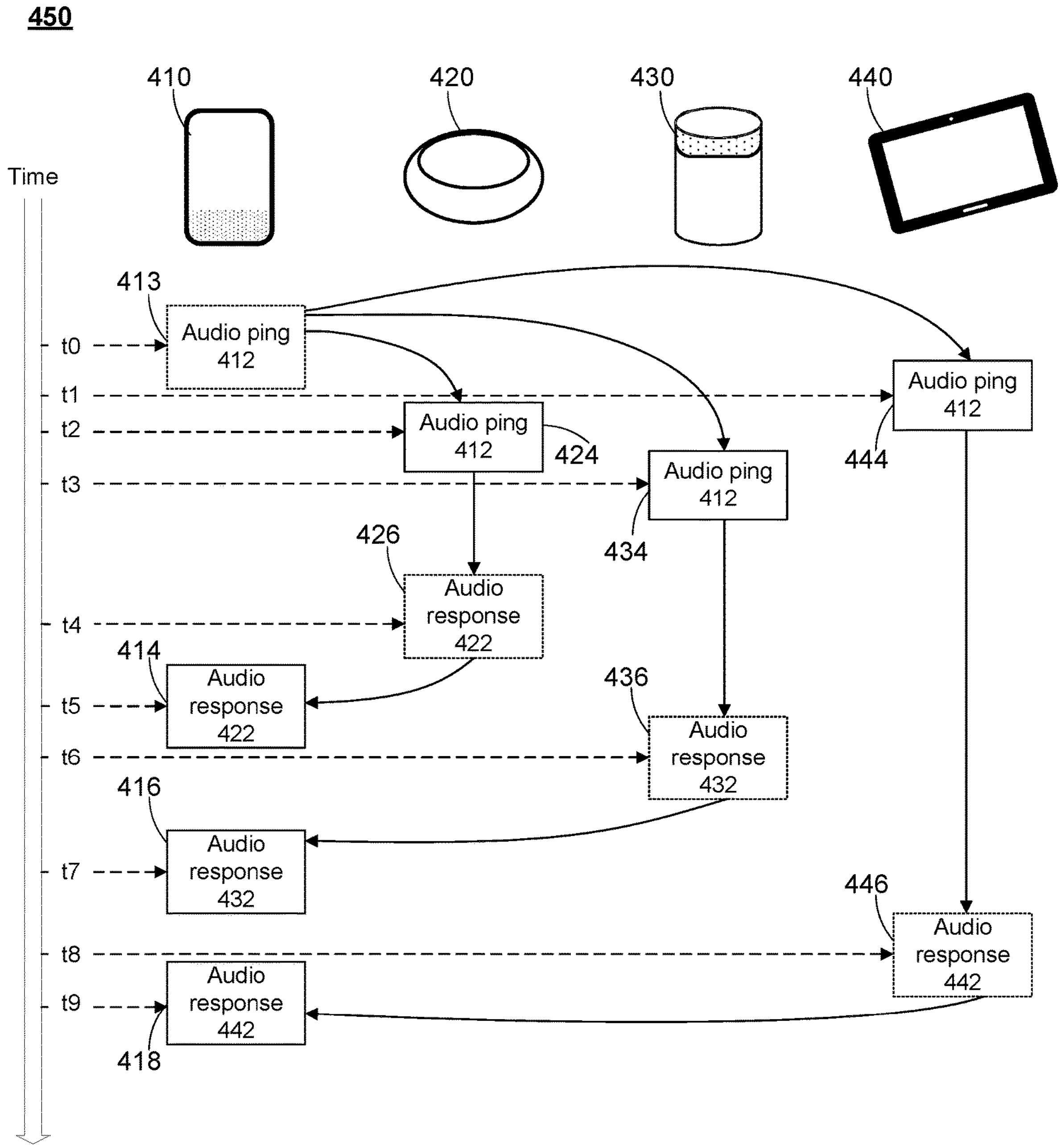
FIG. 4B shows an example of a timeline of audio events between a plurality of devices in accordance with some implementations of the disclosed subject matter.

Turning to FIG. 4B, an example timeline 450 of audio sequence 400 used by a plurality of devices for generating transit times in accordance with some implementations of the disclosed subject matter is shown. Timeline 450 contains representations of audio tones sent and received by leader device 410 and responder devices 420, 430, and 440 in some implementations. In some implementations, blocks of timeline 450 can correspond to blocks of process 300 described above in connection with FIG. 3.

In some implementations, timeline 450 can begin at t0 at 413 with an audio ping 412 broadcast by leader device 410. In some implementations, the time at which 413 occurs can correspond to a start time $T_{start}$ at 312 of process 300 as described in FIG. 3 above.

In some implementations, responder device 420 can register audio ping 412 at t2 at 424. Similarly, in some implementations, responder devices 430 and 440 can register audio ping 412 at t3 at 434 and at t1 at 444, respectively. In some implementations, times t2, t3, and t1 of timeline 450 can correspond to unique arrival times $T_{410,420}$, $T_{410,430}$, and $T_{410,440}$ (i.e., $T_{leader,responder}$ for each leader 410 and responder 420, 430, and 440 pair) at 308 of process 300 as described in FIG. 3 above.

In some implementations, device 420 can register audio ping 412 at any suitable time relative to devices 430 and 440 registering audio ping 412. In some implementations, an elapsed time between broadcast at t0 and registration at t2 can indicate a physical distance between leader device 410 and responder device 420. Similarly, in some implementations, an elapsed time between the broadcast at t0 and registration at t3 and t1 can indicate a physical distance between leader device 410 and responder devices 430 and 440, respectively. For example, in some implementations, responder device 440 can be the closest responder device to leader device 410 and can register audio ping 412 at t1 before audio ping 412 has reached responder device 430 at t3.

In some implementations, responder devices 420, 430, and 440 can each have a unique delay time before responding to audio ping 412, corresponding to a $T_{wait,420}$, $T_{wait,430}$, and $T_{wait,440}$, respectively, at 310 of process 300 as described in connection with FIG. 3 above. In some implementations, responder devices 420, 430, and 440 can respond to audio ping 412 in any suitable order and at any suitable time.

In some implementations, responder device 420 can broadcast audio response 422 at t4 at 426. Similarly, in some implementations, responder devices 430 and 440 can broadcast audio responses 432 and 442 at t6 at 436 and at t8 at 446, respectively.

In some implementations, leader device 410 can register the arrival of audio responses 422, 432, and 442 at t5 at 414, at t7 at 416, and at t9 at 418, respectively. In some implementations, leader device 410 can register the arrival of audio responses 422, 432, and 442 in any order. In some implementations, times t5, t7, and t9 of timeline 450 can correspond to arrival times $T_{420,410}$, $T_{430,410}$, and $T_{440,410}$, respectively (i.e., $T_{responder,leader}$ for each responder 420, 430, 440 and leader 410 pair) at 314 of process 300 as described in connection with FIG. 3 above.

In some implementations, timeline 450 can end after leader device 410 has registered the arrival of audio responses 422, 432, and 442. In some implementations, process 300 can continue at 316 and 318 using the values from timeline 450 above. As an example, in some implementations, determining a transit time at 318 for each pair of leader 410 and responders 420, 430, and 440 can be seen using Equations 1.2, 1.3, and 1.4, respectively, below.

$$T[\text{transit}]_{410,420}=\tfrac{1}{2}*(T_{420,410}-T_{start}-T_{wait,420}) \quad (1.2)$$

$$T[\text{transit}]_{410,430}=\tfrac{1}{2}*(T_{430,410}-T_{start}-T_{wait,430}) \quad (1.3)$$

$$T[\text{transit}]_{410,440}=\tfrac{1}{2}*(T_{440,410}-T_{start}-T_{wait,440}) \quad (1.4)$$

Figure 5A:
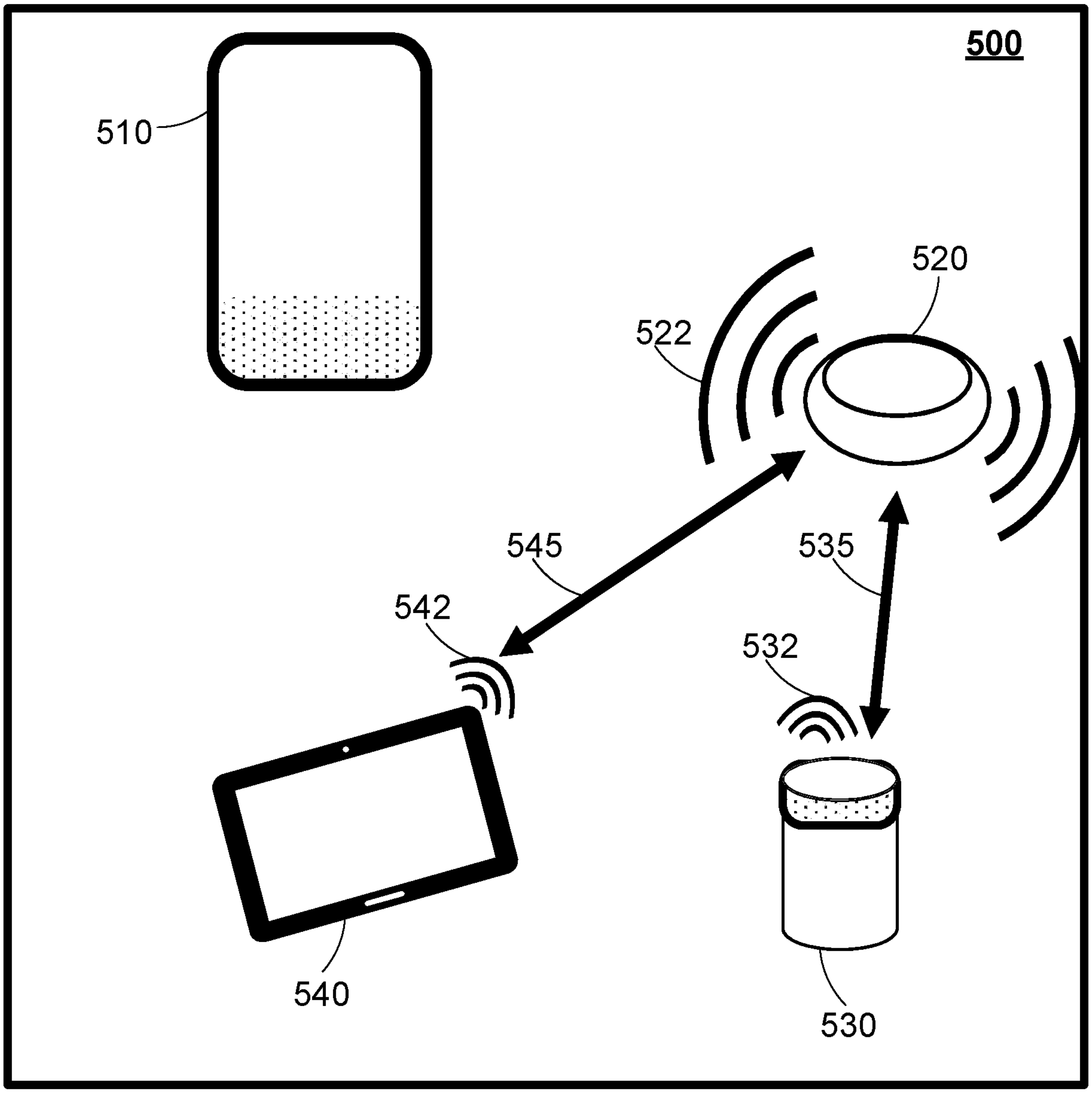
FIG. 5A shows another example illustration of a plurality of devices using an audio sequence to determine transit times in accordance with some implementations of the disclosed subject matter.

Turning to FIG. 5A, an example block diagram of an audio sequence 500 used by a plurality of devices for generating transit times in accordance with some implementations of the disclosed subject matter is shown. In some implementations, audio sequence 500 can follow audio sequence 400 as described at 324 of process 300 in connection with FIG. 3 above.

In some implementations, audio sequence 500 includes a leader device 520, a responder device 510, a responder device 530, and responder device 540. In some implementations, leader device 520 and responder devices 510, 530, and 540 can form a plurality of devices used in process 200 as described above in connection with FIG. 2. In some implementations, any suitable combination of responder devices 510, 530, and 540 can be a responder group as described above in connection with FIG. 3. In some implementations, leader device 520 can be the same device which had the role of responder device 420 in audio sequence 400 of FIG. 4A. Similarly, in some implementations, responder device 510 can be the same device which had the role of leader device 410 in audio sequence 400, and responder devices 530 and 540 can be the same devices which had the roles of responder devices 430 and 440, respectively, in audio sequence 400.

In some implementations, leader device 520 can broadcast an audio ping 522. In some implementations, audio ping 522 can be any suitable audio tone and/or waveform and can contain any suitable audio frequencies. For example, audio ping 522 can be a short (e.g., 10 ms) burst of ultrasonic frequencies in some implementations.

In some implementations, responder device 530 can broadcast an audio response 532. In some implementations, audio response 532 can be any suitable audio tone and/or waveform and can contain any suitable audio frequencies. For example, audio response 532 can be a burst of ultrasonic frequencies in some implementations. In some implementations, audio response 532 can be identical to audio ping 522, and/or mathematically related to audio ping 522 in any suitable manner (e.g., phase shifted, frequency shifted, etc.). In some implementations, audio response 532 can be spectrally distinct from audio ping 522. In some implementations, responder device 530 can send additional communication signals (e.g., wireless messages) to leader device 520 over communication link 535.

In some implementations, responder device 540 can broadcast an audio response 542. In some implementations, audio response 542 can be any suitable audio tone and/or waveform and can contain any suitable audio frequencies. For example, audio response 542 can be a burst of ultrasonic frequencies in some implementations. In some implementations, audio response 542 can be identical to audio ping 522, and/or mathematically related to audio ping 522 in any suitable manner (e.g., phase shifted, frequency shifted, etc.). In some implementations, audio ping 542 can be spectrally distinct from audio ping 522 and/or audio response 532. In some implementations, responder device 540 can send additional communication signals (e.g., wireless messages) to leader device 520 over communication link 545.

Figure 5B:
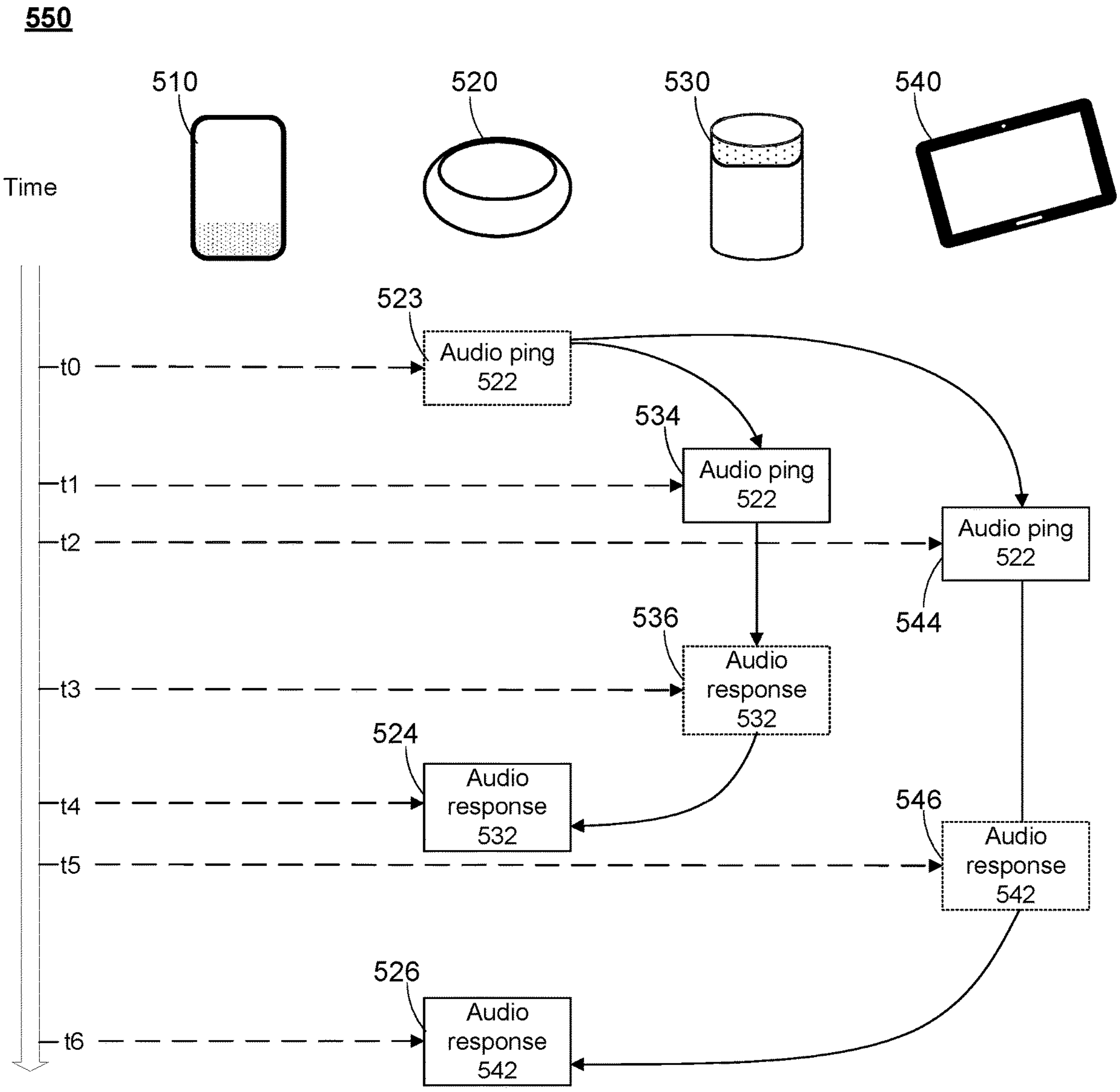
FIG. 5B shows another example of a timeline of audio events between a plurality of devices in accordance with some implementations of the disclosed subject matter.

Turning to FIG. 5B, an example timeline 550 of audio sequence 500 used by a plurality of devices for generating transit times in accordance with some implementations of the disclosed subject matter is shown. Timeline 550 contains representations of audio tones sent and received by leader device 520 and responder devices 510, 530, and 540 in some implementations. In some implementations, blocks of timeline 550 can correspond to blocks of process 300 described above in connection with FIG. 3.

In some implementations, timeline 550 can begin at t0 at 523 with the audio ping 522 broadcast by leader device 520. In some implementations, the time at which 523 occurs can correspond to a start time $T_{start}$ at 312 of process 300 as described in FIG. 3 above.

In some implementations, responder devices 530 and 540 can register audio ping 522 at t1 at 534 and at t2 at 544, respectively. In some implementations, times t1 and t2 can correspond to unique arrival times $T_{520,530}$ and $T_{520,540}$ respectfully (i.e., $T_{leader,responder}$ for pairs leader 520, responder 530 and leader 520, responder 540) at 308 of process 300 as described in FIG. 3 above. In some implementations, responder device 510 can decline to register audio ping 522.

In some implementations, device 530 can register audio ping 522 at 534 at any suitable time relative to device 540 registering audio ping 522 at 544. In some implementations, an elapsed time between broadcast at 523 and registration at 534 can indicate a physical distance between leader device 520 and responder device 530. Similarly, in some implementations, an elapsed time between broadcast at 523 and registration at 544 can indicate a physical distance between leader device 520 and responder device 540.

In some implementations, responder devices 530 and 540 can each have any suitable delay time before responding to audio ping 522, corresponding to a $T_{wait,530}$ and $T_{wait,540}$, respectively, at 310 of process 300 as described in connection with FIG. 3 above. In some implementations, responder devices 530 and 540 can respond to audio ping 522 in any suitable order and at any suitable time.

In some implementations, responder device 530 can broadcast audio response 532 at t3 at 536. Similarly, in some implementations, responder device 540 can broadcast audio response 542 at t5 at 446. In some implementations, responder device 510 can decline to respond to audio ping 522.

In some implementations, leader device 520 can register the arrival of audio responses 532 and 542 at t4 at 524 and at t6 at 526 respectively. In some implementations, leader device can register the arrival of audio responses 532 and 542 in any order. In some implementations, times t4 and t6 of timeline 550 can correspond to arrival times $T_{530,520}$ and $T_{540,520}$, respectively (i.e., $T_{responder,leader}$ for each pair of responder 530, leader 520 and responder 540, leader 520) at 314 of process 300 as described in connection with FIG. 3 above.

In some implementations, timeline 550 can end after leader device 520 has registered the arrival of audio responses 532 and 542. In some implementations, process 300 can continue at 316 and 318 using the values from timeline 550 above. As an example, in some implementations, determining a transit time at 318 for each pair of leader 520, responder 530 and leader 520, responder 540 can be seen using Equations 1.5 and 1.6, respectively, below.

$$T[\text{transit}]_{520,530}=\tfrac{1}{2}*(T_{530,520}-T_{start}-T_{wait,530}) \tag{1.5}$$

$$T[\text{transit}]_{520,540}=\tfrac{1}{2}*(T_{540,520}-T_{start}-T_{wait,540}) \tag{1.6}$$

Figure 6A:
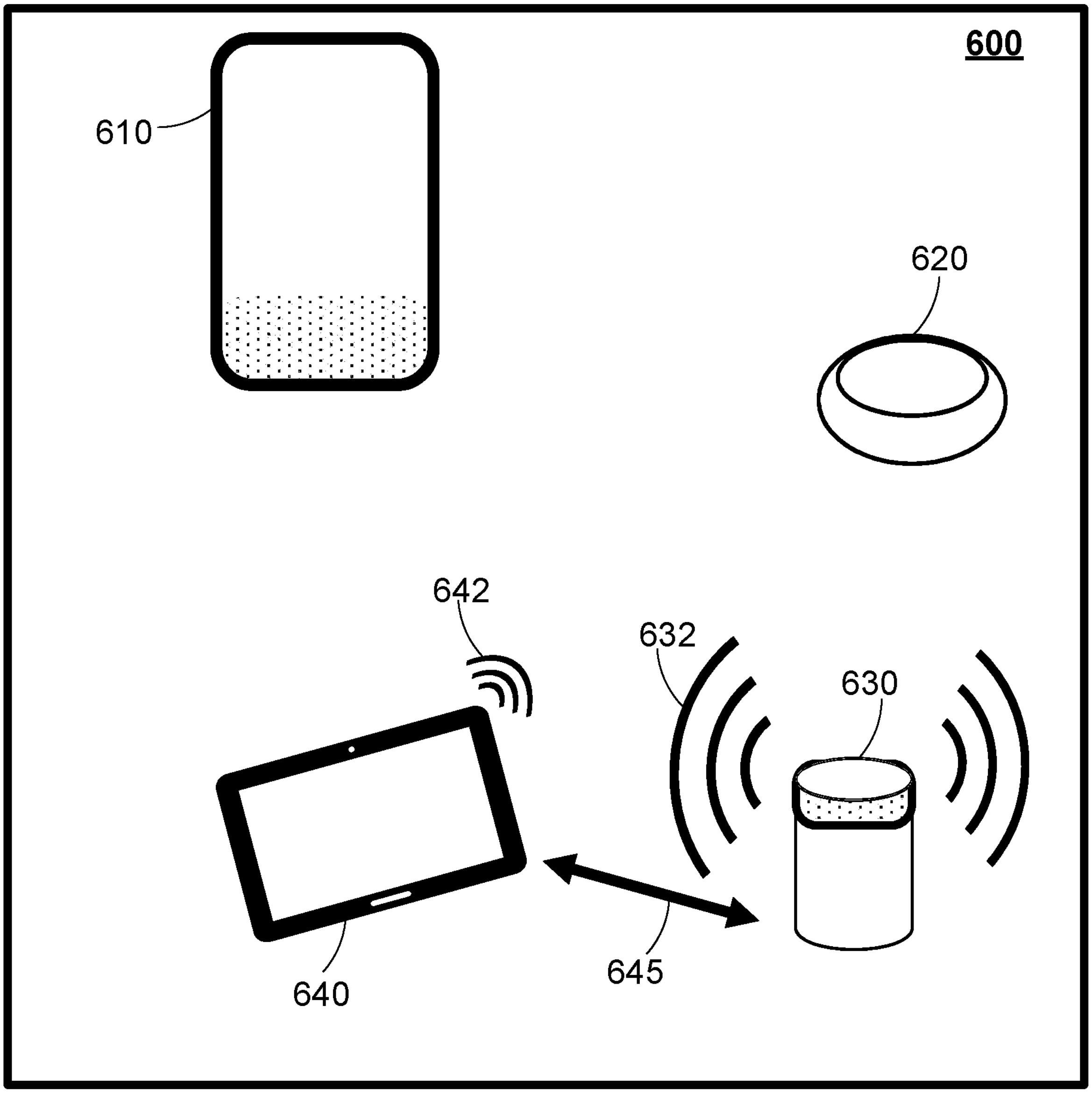
FIG. 6A shows still another example illustration of a plurality of devices using an audio sequence to determine transit times in accordance with some implementations of the disclosed subject matter.

Turning to FIG. 6A, an example block diagram of an audio sequence 600 used by a plurality of devices for generating transit times in accordance with some implementations of the disclosed subject matter is shown. In some implementations, audio sequence 600 can follow audio sequence 500 as described at 324 of process 300 in connection with FIG. 3 above.

In some implementations, audio sequence 600 includes a leader device 630, a responder device 610, a responder device 620, and a responder device 640. In some implementations, leader device 630 and responder devices 610, 620, and 640 can form a plurality of devices used in process 200 as described above in connection with FIG. 2. In some implementations, any suitable combination of responder devices 610, 620, and 640 can be a responder group as described above in connection with FIG. 3. In some implementations, leader device 630 can be the same device which had the role of responder device 430 and responder device 530 in audio sequences 400 and 500, respectively. Similarly, in some implementations, responder device 610 can be the same device which had the role of leader device 410 in audio sequence 400, and responder devices 620 and 640 can be the same devices which had the roles of responder devices 420 and 440, respectively, in audio sequence 400.

In some implementations, leader device 630 can broadcast an audio ping 632. In some implementations, audio ping 632 can be any suitable audio tone and/or waveform and can contain any suitable audio frequencies. For example, audio ping 632 can be a short (e.g., 10 ms) burst of ultrasonic frequencies in some implementations.

In some implementations, responder device 640 can broadcast an audio response 642. In some implementations, audio response 642 can be any suitable audio tone and/or waveform and can contain any suitable audio frequencies. For example, audio response 642 can be a burst of ultrasonic frequencies in some implementations. In some implementations, audio response 642 can be identical to audio ping 632, and/or mathematically related to audio ping 632 in any suitable manner (e.g., phase shifted, frequency shifted, etc.). In some implementations, audio response 642 can be spectrally distinct from audio ping 632. In some implementations, responder device 640 can send additional communication signals (e.g., wireless messages) to leader device 630 over communication link 645.

Figure 6B:
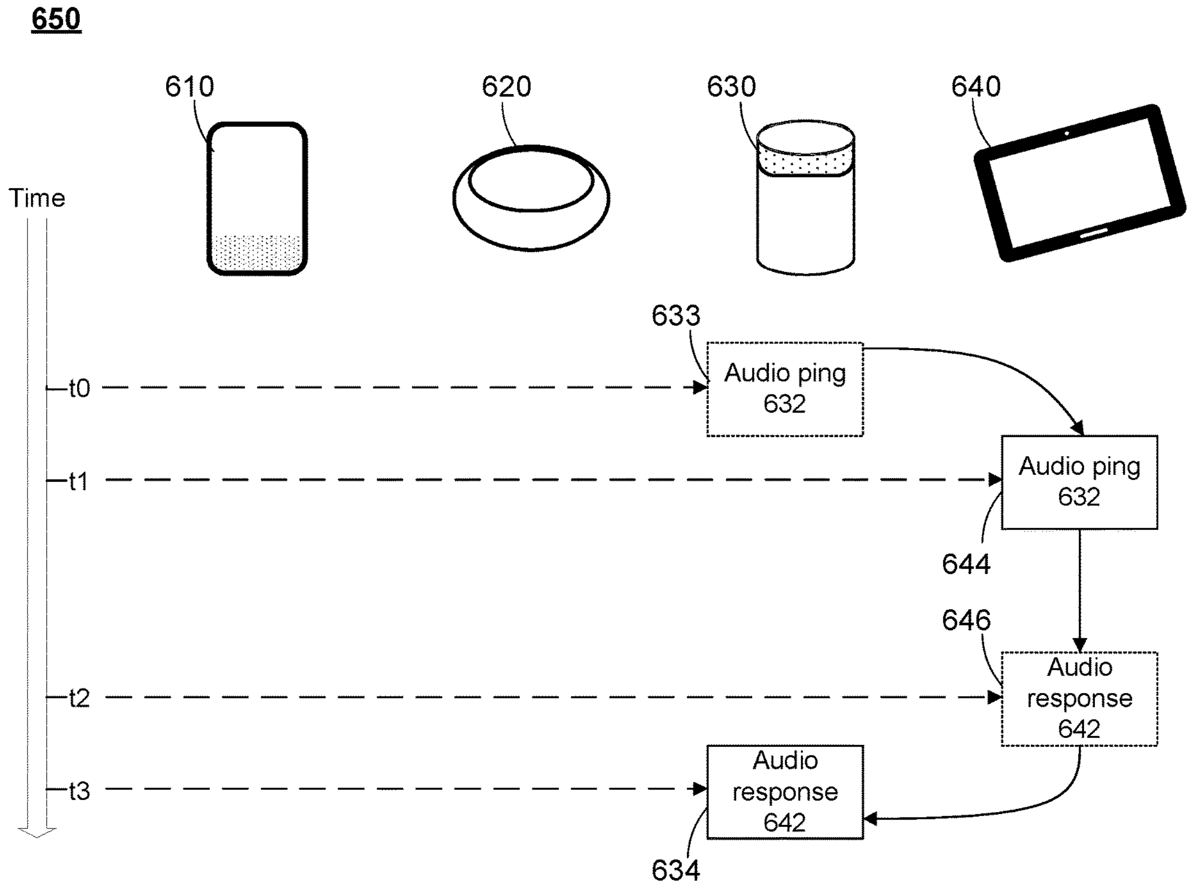
FIG. 6B shows still another example of a timeline of audio events between a plurality of devices in accordance with some implementations of the disclosed subject matter.

Turning to FIG. 6B, an example timeline 650 of audio sequence 600 used by a plurality of devices for generating transit times in accordance with some implementations of the disclosed subject matter is shown. Timeline 650 contains representations of audio tones sent and received by leader device 630 and responder devices 610, 620, and 640 in some implementations. In some implementations, blocks of timeline 650 can correspond to blocks of process 300 described above in connection with FIG. 3.

In some implementations, timeline 650 can begin at t0 at 633 with the audio ping 632 broadcast by leader device 630. In some implementations, time 633 of timeline 650 can correspond to a start time $T_{start}$ at 312 of process 300 as described in FIG. 3 above.

In some implementations, responder device 640 can register audio ping 632 at t1 at 644. In some implementations, time t1 can correspond to unique arrival time $T_{530,540}$ (i.e., $T_{leader,responder}$) at 308 of process 300 as described in FIG. 3 above. In some implementations, responder devices 610 and 620 can decline to register audio ping 632.

In some implementations, an elapsed time between broadcast at t0 and registration at t1 can indicate a physical distance between leader device 630 and responder device 640.

In some implementations responder device 640 can have a delay time before responding to audio ping 632, corresponding to a $T_{wait,540}$ at 310 of process 300 as described in connection with FIG. 3 above. In some implementations, responder device 640 can broadcast audio response 642 at t2 at 646. In some implementations, leader device 630 can register the arrival of audio response 642 at t3 at 634. In some implementations, time t3 of timeline 650 can correspond to $T_{640,630}$ (i.e., $T_{responder,leader}$) at 314 of process 300 as described in connection with FIG. 3 above.

In some implementations, timeline 650 can end after leader device 630 has registered the arrival of audio response 642 at t3. In some implementations, process 300 can continue at 316 and 318 using the values from timeline 650 above. As an example, in some implementations, determining a transit time at 318 for the leader 630-responder 640 pair can be seen using Equation 1.7 below.

$$T[\text{transit}]_{630,640}=\tfrac{1}{2}*(T_{640,630}-T_{start}-T_{wait,640}) \tag{1.7}$$

Figure 7:
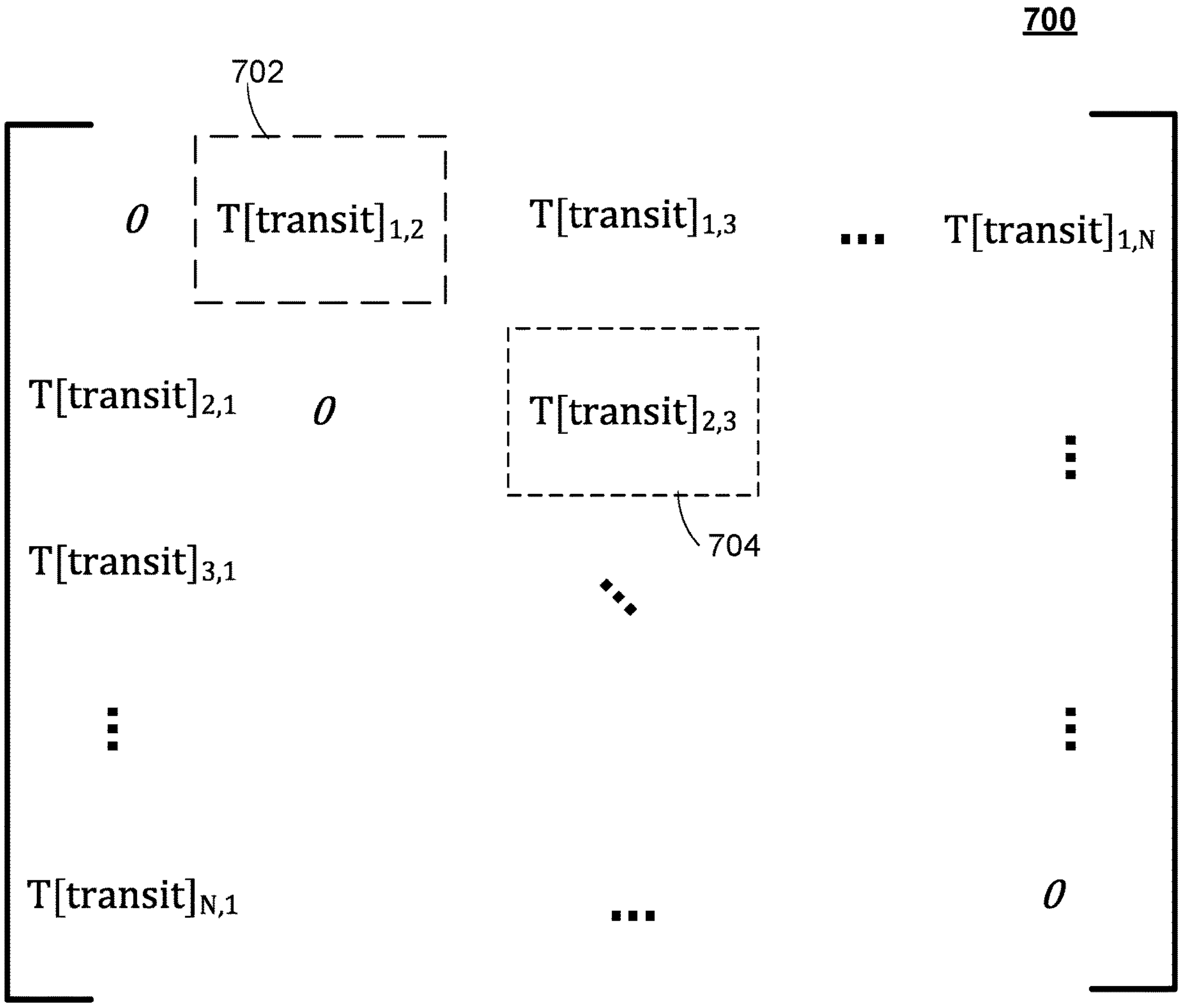
FIG. 7 shows an example matrix having a plurality of transit times in accordance with some implementations of the disclosed subject matter.

Turning to FIG. 7, an example matrix 700 of the plurality of transit times used in process 200 in accordance with some implementations is shown. In some implementations, a quantity of the entries in matrix 700 can correspond to a quantity of devices in the plurality of devices. As a numeric example, the plurality of devices at 208 of process 200 above can have N devices in some implementations. Continuing this example, in some implementations, matrix 700 can have N rows, N columns, and entries of 0 on the diagonal in which the row number equals the column number. The number of entries within the plurality of transit times can, in some implementations, be N-choose-2, as shown in Equation 3 below.

$$\binom{N}{2}=\frac{N!}{2(N-2)!} \tag{3}$$

In some implementations, matrix 700 can be arranged such that for $i^{th}$ device in the plurality of devices as the leader device and the $j^{th}$ device in the plurality of devices as the responder device, the transit time calculated in FIGS. 2 and 3 can be found within matrix 700 at matrix coordinates (row, column) of (i,j) and/or at coordinates of (j,i). For example, in some implementations, matrix entry 702, namely, $T_{1,2}$, found at matrix coordinates (1,2) can represent the transit time calculated within process 300 for device 1 as a leader device and device 2 as responder device. In some implementations, devices 410 and 420 from timeline 450 and Equation 1.1 as described in connection with FIG. 4B above can be illustrative of how matrix entry 702 ($T_{1,2}$) is calculated. In some implementations, matrix entry 702 can be repeated within matrix 700 at matrix coordinates (2,1) as the transit time between devices 1 and 2 can be assumed to be symmetric when considering the transit time between devices 2 and 1.

Similarly, for example, entry 704, namely, $T_{2,3}$, can represent the transit time calculated within process 300 above for device 2 acting as a leader device and device 3 as responder device. In some implementations, devices 520 and 530 from timeline 550 and Equation 1.4 as described in connection with FIG. 5B above can be illustrative of how matrix entry 704 ($T_{2,3}$) is calculated.

Figure 8:
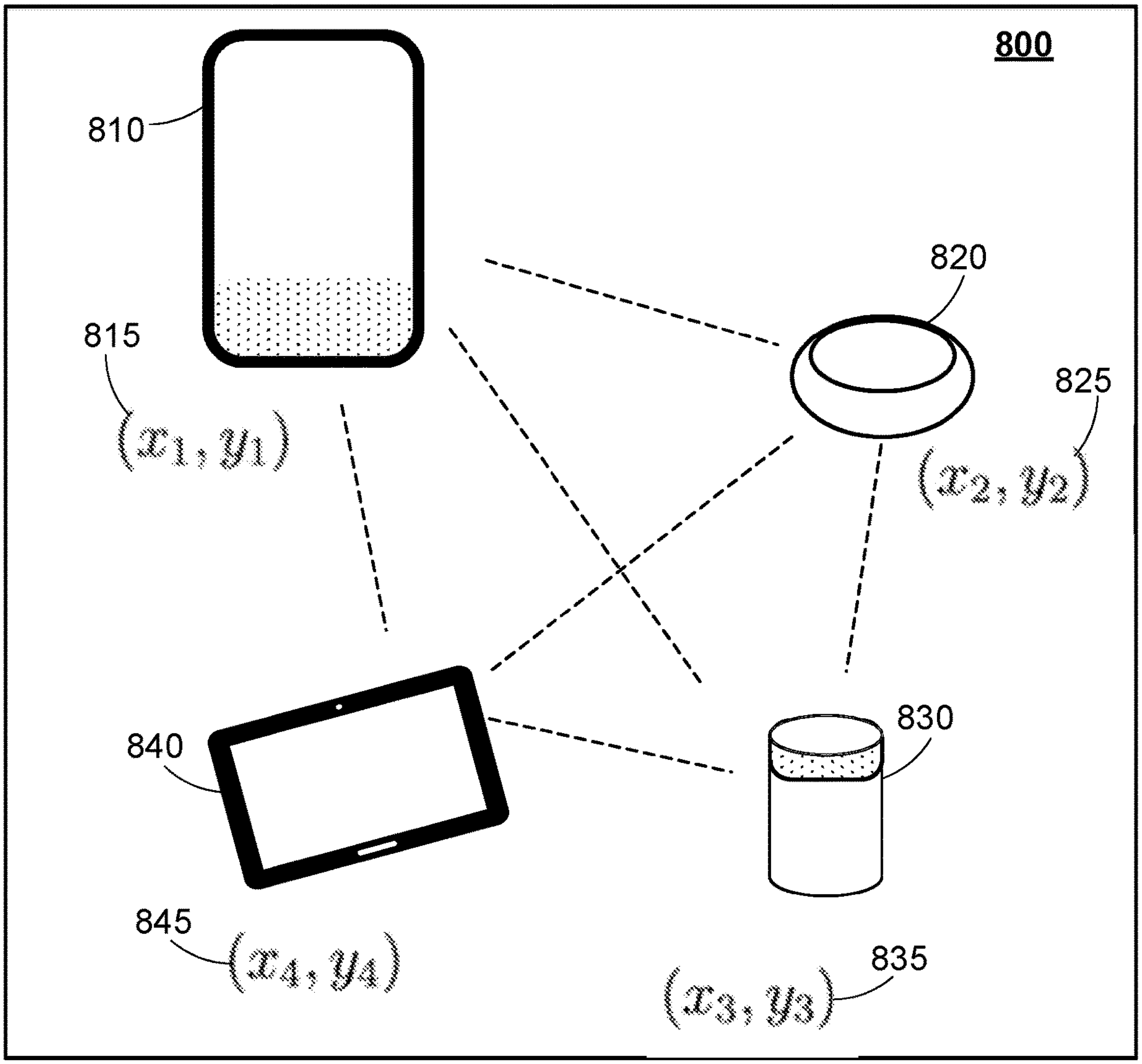
FIG. 8 shows an example of a plurality of devices each with an identified set of coordinates in accordance with some implementations of the disclosed subject matter.

Turning to FIG. 8, an example block diagram 800 of a plurality of devices with a plurality of sets of coordinates identified using the mechanisms described in accordance with some implementations is shown. As illustrated, example 800 can include a device 810 with a set of coordinates 815, a device 820 with a set of coordinates 825, a device 830 with a set of coordinates 835, and a device 840 with a set of coordinates 845.

In some implementations, devices 810, 820, 830, and 840 can correspond to the plurality of devices used in process 200 as described in FIG. 2 above and in process 300 as described in FIG. 2 above. For example, in some implementations, device 810 can correspond to the devices 410, 510, 610 from FIGS. 4A, 5A, and 6A, respectively. In some implementations, set of coordinates 815 can include two real-valued, non-negative decimal numbers. In some implementations, set of coordinates 815 can use any suitable distance units (e.g., centimeters, inches, feet, meters, etc.). In some implementations, set of coordinates 815 can be determined as part of the plurality of coordinates determined at 212 of process 200 and assigned to device 810 at 214 of process 200 as described above in connection with FIG. 2.

Similarly, in some implementations, device 820 can correspond to the devices 420, 520, 620 from FIGS. 4A, 5A, and 6A, respectively. In some implementations, set of coordinates 825 can include two real-valued, non-negative decimal numbers. In some implementations, set of coordinates 825 can use any suitable distance units (e.g., centimeters, inches, feet, meters, etc.). In some implementations, set of coordinates 825 can be determined as part of the plurality of coordinates determined at 212 of process 200 and assigned to device 820 at 214 of process 200 as described above in connection with FIG. 2.

Similarly, in some implementations, device 830 can correspond to the devices 430, 530, 630 from FIGS. 4A, 5A, and 6A, respectively. In some implementations, set of coordinates 835 can include two real-valued, non-negative decimal numbers. In some implementations, set of coordinates 835 can use any suitable distance units (e.g., centimeters, inches, feet, meters, etc.). In some implementations, set of coordinates 835 can be determined as part of the plurality of coordinates determined at 212 of process 200 and assigned to device 830 at 214 of process 200 as described above in connection with FIG. 2.

Similarly, in some implementations, device 840 can correspond to the devices 440, 540, 640 from FIGS. 4A, 5A, and 6A, respectively. In some implementations, set of coordinates 845 can include two real-valued, non-negative decimal numbers. In some implementations, set of coordinates 845 can use any suitable distance units (e.g., centimeters, inches, feet, meters, etc.). In some implementations, set of coordinates 845 can be determined as part of the plurality of coordinates determined at 212 of process 200 and assigned to device 840 at 214 of process 200 as described above in connection with FIG. 2.

Figure 9:
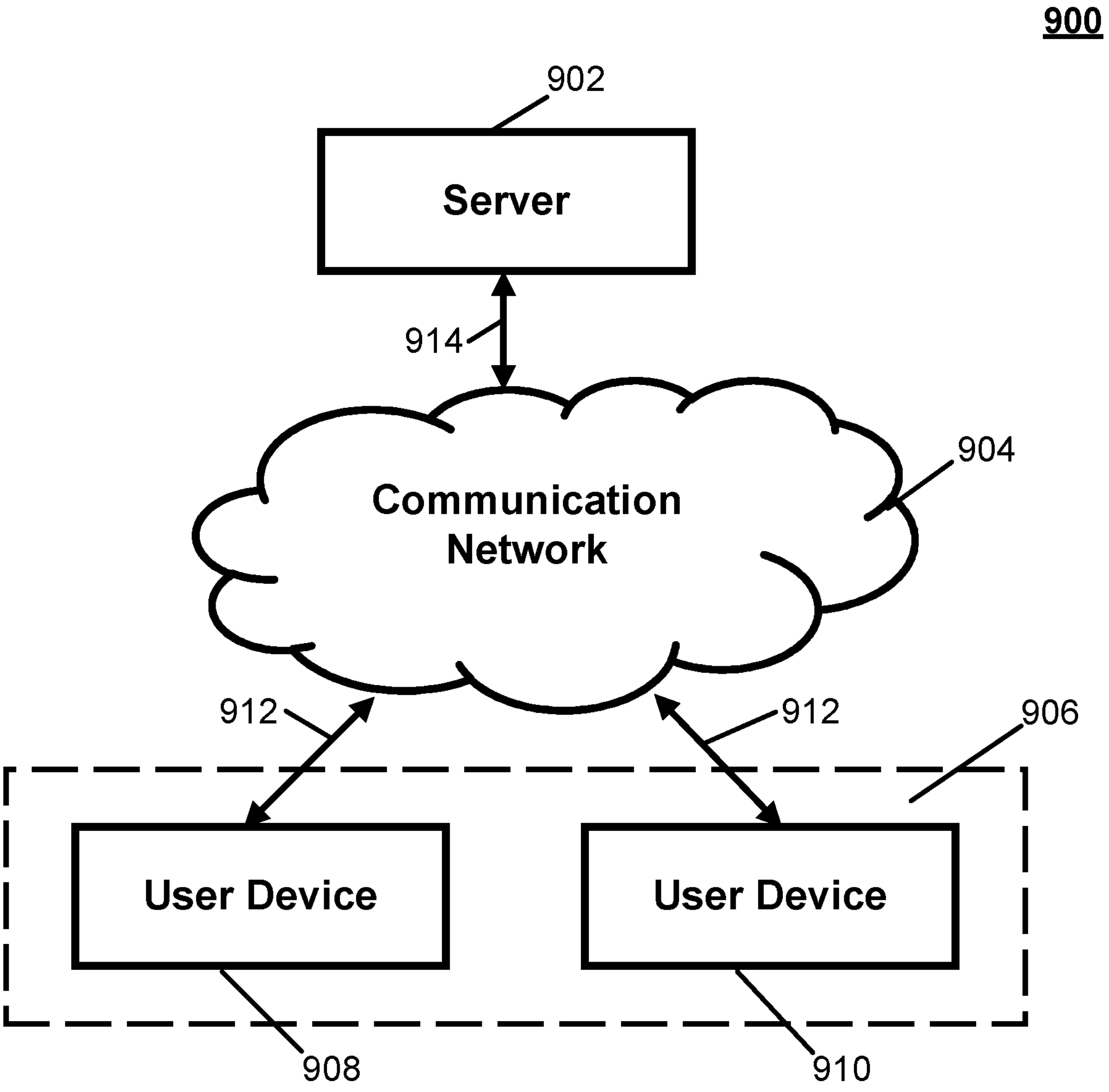
FIG. 9 shows an example block diagram of a system that can be used to implement mechanisms described herein in accordance with some implementations of the disclosed subject matter.

Turning to FIG. 9, an example 900 of hardware for identifying a plurality of sets of coordinates for a plurality of devices in accordance with some implementations is shown. As illustrated, hardware 900 can include a server 902, a communication network 904, and/or one or more user devices 906, such as user devices 908 and 910.

Server 902 can be any suitable server(s) for storing information, data, programs, media content, and/or any other suitable content. In some implementations, server 902 can perform any suitable function(s).

Communication network 904 can be any suitable combination of one or more wired and/or wireless networks in some implementations. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 906 can be connected by one or more communications links (e.g., communications links 912) to communication network 904 that can be linked via one or more communications links (e.g., communications links 914) to server 902. The communications links can be any communications links suitable for communicating data among user devices 906 and server 902 such as network links, dial-up links, wireless links, hard-wired links, any other suitable communications links, or any suitable combination of such links.

User devices 906 can include any one or more user devices suitable for use with process 200 and process 300. In some implementations, user device 906 can include any suitable type of user device, such as mobile phones, tablet computers, wearable computers, laptop computers, desktop computers, smart televisions, media players, game consoles, vehicle information and/or entertainment systems, and/or any other suitable type of user device.

Although server 902 is illustrated as one device, the functions performed by server 902 can be performed using any suitable number of devices in some implementations. For example, in some implementations, multiple devices can be used to implement the functions performed by server 902.

Although two user devices 908 and 910 are shown in FIG. 9 to avoid overcomplicating the figure, any suitable number of user devices, (including only one user device) and/or any suitable types of user devices, can be used in some implementations.

Figure 10:
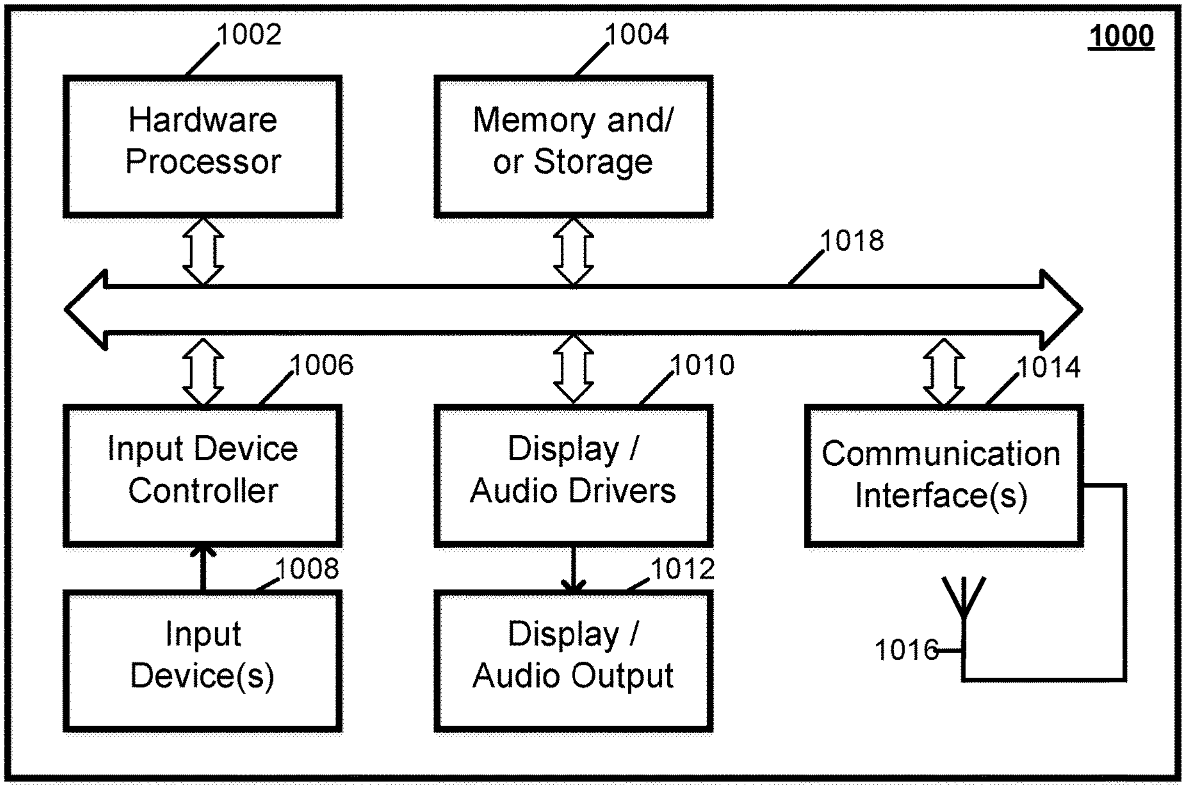
FIG. 10 shows an example block diagram of hardware that can be used in a server and/or a user device of FIGS. 4A, 5A, 6A, and 8 in accordance with some implementations of the disclosed subject matter.

Server 902 and user devices 906 can be implemented using any suitable hardware in some implementations. For example, in some implementations, devices 902 and 906 can be implemented using any suitable general-purpose computer or special-purpose computer and can include any suitable hardware. For example, as illustrated in example hardware 1000 of FIG. 10, such hardware can include hardware processor 1002, memory and/or storage 1004, an input device controller 1006, an input device 1008, display/audio drivers 1010, display and audio output circuitry 1012, communication interface(s) 1014, an antenna 1016, and a bus 1018.

Hardware processor 1002 can include any suitable hardware processor, such as a microprocessor, a micro-controller, digital signal processor(s), dedicated logic, and/or any other suitable circuitry for controlling the functioning of a general-purpose computer or a special-purpose computer in some implementations. In some implementations, hardware processor 1002 can be controlled by a computer program stored in memory and/or storage 1004. For example, in some implementations, the computer program can cause hardware processor 1002 to perform functions described herein.

Memory and/or storage 1004 can be any suitable memory and/or storage for storing programs, data, documents, and/or any other suitable information in some implementations. For example, memory and/or storage 1004 can include random access memory, read-only memory, flash memory, hard disk storage, optical media, and/or any other suitable memory.

Input device controller 1006 can be any suitable circuitry for controlling and receiving input from one or more input devices 1008 in some implementations. For example, input device controller 1006 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 1010 can be any suitable circuitry for controlling and driving output to one or more display/audio output devices 1012 in some implementations. For example, display/audio drivers 1010 can be circuitry for driving a touchscreen, a flat-panel display, a cathode ray tube display, a projector, a speaker or speakers, and/or any other suitable display and/or presentation devices.

Communication interface(s) 1014 can be any suitable circuitry for interfacing with one or more communication networks, such as network 904 as shown in FIG. 9. For example, interface(s) 1014 can include network interface card circuitry, wireless communication circuitry, and/or any other suitable type of communication network circuitry.

Antenna 1016 can be any suitable one or more antennas for wirelessly communicating with a communication network (e.g., communication network 904) in some implementations. In some implementations, antenna 1016 can be omitted.

Bus 1018 can be any suitable mechanism for communicating between two or more components 1002, 1004, 1006, 1010, and 1014 in some implementations.

Any other suitable components can be included in hardware 1000 in accordance with some implementations.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method comprising:

identifying a first device and a second device associated with a user account;

causing the first device and the second device to perform an audio sequence;

receiving a first elapsed time between a first message emitted by the first device and a second message received at the first device;

receiving a second elapsed time between the first message received at the second device and the second message emitted by the second device;

determining a first set of coordinates and a second set of coordinates based on the first elapsed time and the second elapsed time; and causing at least one of the first device or the second device to play spatial audio determined from the first set of coordinates and the second set of coordinates.

2. The method of claim 1, wherein the first device and the second device includes a first leader device and a first responder device, and wherein the causing the first device and the second device to perform the audio sequence includes causing the first leader device to:

select a first ping audio tone from a library of audio tones;

cause first responder device to receive the first ping audio tone;

provide response instructions to the first responder device, wherein the response instructions include instructions to:

emit a response audio tone selected from the library of audio tones; and determine a first delay time including an elapsed time from receiving the first ping audio tone to emitting the response audio tone;

play the first ping audio tone;

determine a first start time;

receive the response audio tone from the first responder device;

determine a first response arrival time corresponding to the response audio tone received from the first responder device;

receive the first delay time for the first responder device;

determine a round-trip transit time the first responder device based on the first start time and the first response arrival time; and send the round-trip transit time the first responder device and received delay times to a server.

3. The method of claim 2, wherein the causing the first device and the second device to perform the audio sequence further includes causing the first leader device to:

set the first responder device as a second leader device; and wherein the second leader device:

selects a second ping audio tone from the library of audio tones;

sets the first leader device as a second responder device;

causes the second responder device to receive the second ping audio tone;

provides response instructions to the second responder device, wherein the response instructions include instructions to:

emit a second response audio tone selected from the library of audio tones; and determine a second delay time including an elapsed time from receiving the second ping audio tone to emitting the second response audio tone;

plays the second ping audio tone;

determines a second start time;

receives the response audio tone from the second responder device;

determines a second response arrival time corresponding to the response audio tone received from the second responder device;

receives the second delay time for the second responder device;

determines a round-trip transit time for the second responder device based on the second start time and the second response arrival time; and sends the round-trip transit time for the second responder device and the received delay times to a server.

4. The method of claim 1, wherein the causing the first device and the second device to perform the audio sequence includes one or more of the first device and the second device emitting one or more of a plurality of audio tones.

5. The method of claim 1, wherein the causing the first device and the second device to perform the audio sequence includes generating an audio tone including frequencies outside a range of human hearing.

6. The method of claim 1, wherein playing the spatial audio includes using the first set of coordinates and the second set of coordinates to determine an audio characteristic for at least one device of the first device and the second device.

7. The method of claim 1, wherein playing the spatial audio includes using the first set of coordinates and the second set of coordinates and using a location corresponding to a user device to modify at least one characteristic of audio played by at least one device of the first device and the second device.

8. A system comprising:

a hardware processor that:

causes a first device and a second device to perform an audio sequence;

receives a first elapsed time between a first message emitted by the first device and a second message received at the first device;

receives a second elapsed time between the first message received at the second device and the second message emitted by the second device;

determines a first set of coordinates and a second set of coordinates based on the first elapsed time and the second elapsed time; and causes at least one of the first device or the second device to play spatial audio determined from the first set of coordinates and the second set of coordinates.

9. The system of claim 8, wherein the first device and the second device includes a first leader device and a first responder device, and wherein the causing the first device and the second device to perform the audio sequence includes causing the first leader device to:

select a first ping audio tone from a library of audio tones;

cause the first responder device to receive the first ping audio tone;

provide response instructions to the first responder device, wherein the response instructions include instructions to:

emit a response audio tone selected from the library of audio tones; and determine a first delay time including an elapsed time from receiving the first ping audio tone to emitting the response audio tone;

play the first ping audio tone;

determine a first start time;

receive the response audio tone from the first responder device;

determine a first response arrival time corresponding to the response audio tone received from the first responder device;

receive the first delay time for the first responder device;

determine a round-trip transit time the first responder device based on the first start time and the first response arrival time; and send the round-trip transit time the first responder device and received delay times to a server.

10. The system of claim 9, wherein the causing the first device and the second device to perform the audio sequence further includes causing the first leader device to:

set the first responder device as a second leader device; and wherein the second leader device:

selects a second ping audio tone from the library of audio tones;

sets the first leader device as a second responder device;

causes the second responder device to receive the second ping audio tone;

provides response instructions to the second responder device, wherein the response instructions include instructions to:

emit a second response audio tone selected from the library of audio tones; and determine a second delay time including an elapsed time from receiving the second ping audio tone to emitting the second response audio tone;

plays the second ping audio tone;

determines a second start time;

receives the response audio tone from the second responder device;

determines a second response arrival time corresponding to the response audio tone received from the second responder device;

receives the second delay time for the second responder device;

determines a round-trip transit time for the second responder device based on the second start time and the second response arrival time; and sends the round-trip transit time for the second responder device and the received delay times to a server.

11. The system of claim 8, wherein the causing the first device and the second device to perform the audio sequence includes one or more of the first device and the second device emitting one or more of a plurality of audio tones.

12. The system of claim 8, wherein the causing the first device and the second device to perform the audio sequence includes generating an audio tone including frequencies outside a range of human hearing.

13. The system of claim 8, wherein playing the spatial audio includes using the first set of coordinates and the second set of coordinates to determine an audio characteristic for at least one device of the first device and the second device.

14. The system of claim 8, wherein playing the spatial audio includes using the first set of coordinates and the second set of coordinates and using a location corresponding to a user device to modify at least one characteristic of audio played by at least one device of the first device and the second device.

15. A non-transitory computer-readable medium containing computer executable instructions that, when executed by a processor, cause the processor to execute a method for identifying a plurality of sets of coordinates for a plurality of devices, the method comprising:

causing a first device and a second device to perform an audio sequence;

receiving a first elapsed time between a first message emitted by the first device and a second message received at the first device;

receiving a second elapsed time between the first message received at the second device and the second message emitted by the second device;

determining a first set of coordinates and a second set of coordinates based on the first elapsed time and the second elapsed time; and causing at least one of the first device or the second device to play spatial audio determined from the first set of coordinates and the second set of coordinates.

16. The non-transitory computer-readable medium of claim 15, wherein the first device and the second device includes a first leader device and a first responder device, and wherein the causing the first device and the second device to perform the audio sequence includes causing the first leader device to:

select a first ping audio tone from a library of audio tones;

cause the first responder device to receive the first ping audio tone;

provide response instructions to the first responder device, wherein the response instructions include instructions to:

emit a response audio tone selected from the library of audio tones; and determine a first delay time including an elapsed time from receiving the first ping audio tone to emitting the response audio tone;

play the first ping audio tone;

determine a first start time;

receive the response audio tone from the first responder device;

determine a first response arrival time corresponding to the response audio tone received from the first responder device;

receive the first delay time for the first responder device;

determine a round-trip transit time the first responder device based on the first start time and the first response arrival time; and send the round-trip transit time the first responder device and received delay times to a server.

17. The non-transitory computer-readable medium of claim 16, wherein the causing the first device and the second device to perform the audio sequence further includes causing the first leader device to:

set the first responder device as a second leader device; and wherein the second leader device:

selects a second ping audio tone from the library of audio tones;

sets the first leader device as a second responder device;

causes the second responder device to receive the second ping audio tone;

provides response instructions to the second responder device, wherein the response instructions include instructions to:

emit a second response audio tone selected from the library of audio tones; and determine a second delay time including an elapsed time from receiving the second ping audio tone to emitting the second response audio tone;

plays the second ping audio tone;

determines a second start time;

receives the response audio tone from the second responder device;

determines a second response arrival time corresponding to the response audio tone received from the second responder device;

receives the second delay time for the second responder device;

determines a round-trip transit time for the second responder device based on the second start time and the second response arrival time; and sends the round-trip transit time for the second responder device and the received delay times to a server.

18. The non-transitory computer-readable medium of claim 15, wherein the causing the first device and the second device to perform the audio sequence includes one or more of the first device and the second device emitting one or more of a plurality of audio tones.

19. The non-transitory computer-readable medium of claim 15, wherein the causing the first device and the second device to perform the audio sequence includes generating an audio tone including frequencies outside a range of human hearing.

20. The non-transitory computer-readable medium of claim 15, wherein playing the spatial audio includes using the first set of coordinates and the second set of coordinates to determine an audio characteristic for at least one device of the first device and the second device.

21. The non-transitory computer-readable medium of claim 15, wherein playing the spatial audio includes using the first set of coordinates and the second set of coordinates and using a location corresponding to a user device to modify at least one characteristic of audio played by at least one device of the first device and the second device.

* * * * *